United States Patent [19]

Watson et al.

[11] 4,455,607

[45] Jun. 19, 1984

[54] PROGRAMMABLE CALCULATOR HAVING KEYS FOR PERFORMING ANGULAR MEASUREMENT UNIT CONVERSION

[75] Inventors: Robert E. Watson; Jack M. Walden; Charles W. Near, all of Loveland, Colo.

[73] Assignee: Hewlett-Packard Company, Palo Alto, Calif.

[21] Appl. No.: 466,449

[22] Filed: Feb. 15, 1983

Related U.S. Application Data

[60] Division of Ser. No. 239,867, Mar. 2, 1981, Pat. No. 4,384,328, which is a continuation of Ser. No. 085,342, Oct. 16, 1979, abandoned, which is a continuation of Ser. No. 850,329, Nov. 10, 1977, abandoned, which is a division of Ser. No. 535,750, Dec. 23, 1974, Pat. No. 4,063,221, which is a division of Ser. No. 153,437, Jun. 15, 1971, Pat. No. 3,859,635.

[51] Int. Cl.³ .................. G06F 3/02; G06F 3/14; G06F 5/00
[52] U.S. Cl. .................................................... 364/200
[58] Field of Search ... 364/200 MS File, 900 MS File

[56] References Cited

U.S. PATENT DOCUMENTS 3,760,375  9/1973  Irwin et al. ...................... 364/200
4,015,245  3/1977  Mercurio et al. ................ 364/200
4,127,897  11/1978  Spangler et al. ................ 364/900

Primary Examiner—Harvey E. Springborn
Attorney, Agent, or Firm—William E. Hein; Roland I. Griffin

[57] ABSTRACT

A programmable calculator having modular read-write and read-only memory units, a central processing unit, a keyboard input unit, and an output display unit, includes keys on the keyboard input unit for performing angular measurement unit conversion.

1 Claim, 3 Drawing Figures

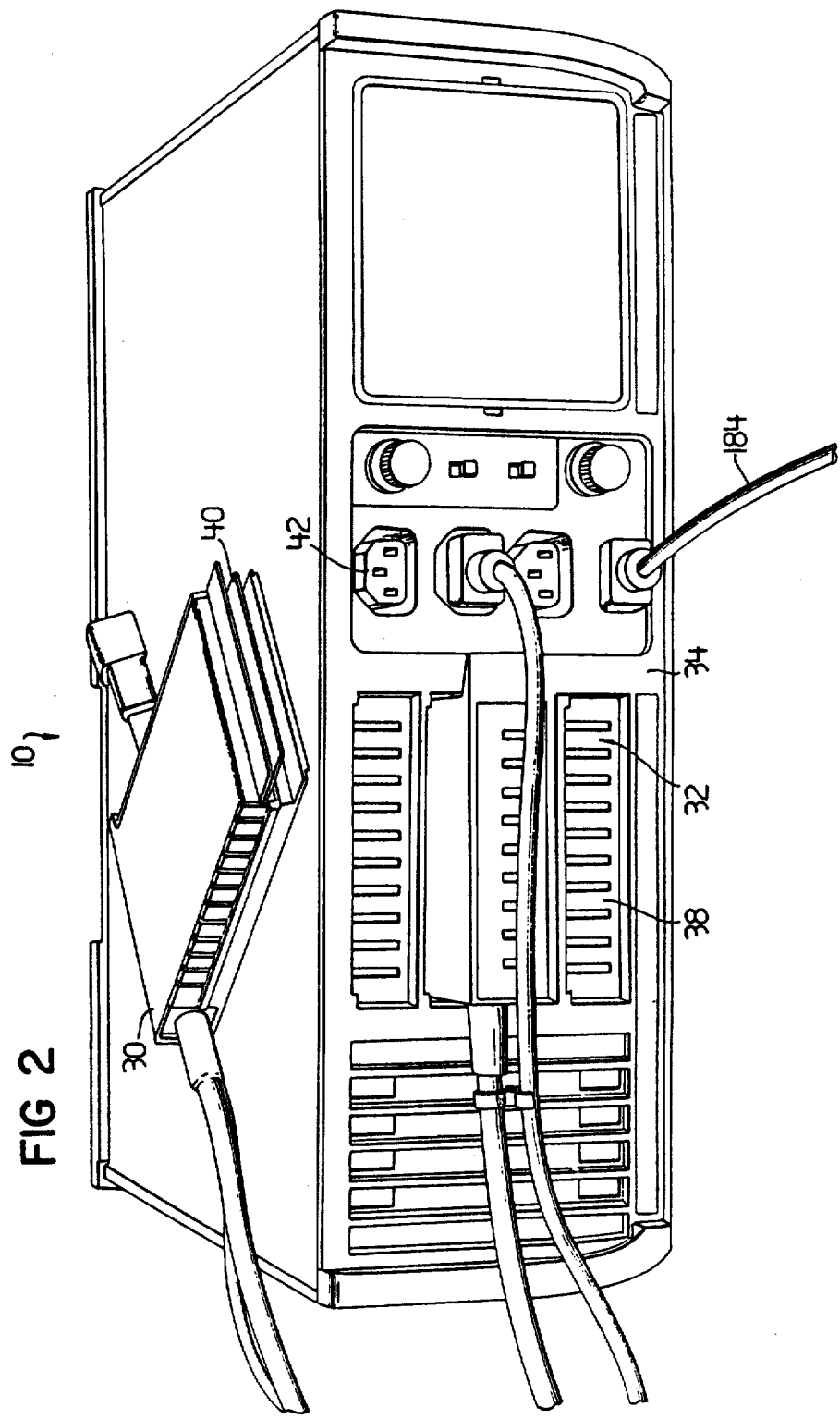

PROGRAMMABLE CALCULATOR HAVING KEYS FOR PERFORMING ANGULAR MEASUREMENT UNIT CONVERSION

CROSS REFERENCE TO RELATED APPLICATIONS

This is a divisional of application Ser. No. 239,867 filed on Mar. 2, 1981, now U.S. Pat. No. 4,384,328, which is in turn a continuation of application Ser. No. 085,342, filed on Oct. 16, 1979 and which is now abandoned, which is in turn a continuation of application Ser. No. 850,329, filed on Nov. 10, 1977, and which is now abandoned, which is in turn a divisional of application Ser. No. 535,750, filed on Dec. 23, 1974, now issued as U.S. Pat. 4,063,221, which is in turn a divisional of application Ser. No. 153,437, filed on June 15, 1971, now issued as U.S. Pat. No. 3,859,635. The subject matter of U.S. Pat. No. 3,859,635 is incorporated herein by reference.

BACKGROUND OF THE INVENTION

This invention relates generally to calculators and improvements therein and more particularly to programmable calculators that may be controlled both manually from the keyboard input unit and automatically by a stored program loaded into the calculator from the keyboard input unit or an external record member.

Conventional programmable calculators generally have less capability and flexibility than is required to meet the needs of many users. For example, they typically cannot be readily expanded and adapted by the user to separately increase the amount of program and data storage memory or to perform special keyboard functions oriented toward the environment of the user. They also typically cannot perform indirectly addressed numeric data register transfers and arithmetic without utilizing available working registers for addresses rather than data. This seriously limits their ability to efficiently perform complex operations such as file manipulations or matrix arithmetic. Moreover, they typically have a very limited capability for performing direct arithmetic between working and storage memory registers and little or no capability for performing indirect arithmetic between working and storage memory registers.

In some conventional programmable calculators a program stored within the calculator can be recorded onto an external magnetic record member and can later be reloaded back into the calculator from the magnetic record member. However, data and programs stored within these calculators typically cannot be separately recorded onto an external magnetic record member and later separately reloaded back into the calculator therefrom. Moreover, these calculators have no provision for making a program secure when it is recorded onto an external magnetic record member. Any user may therefore re-record the program or obtain an indication of the individual program steps once the program is reloaded into the calculator.

Conventional programmable calculators with self-contained output printer units typically have a very limited alpha capability of only a few selected characters confined to certain columns of the printer. They are therefore typically unable to print out both a numeric and a distinct mnemonic representation of every program step of every program stored within the calculator. Furthermore, they are typically unable to print out labels for inputs to and outputs from the calculator or messages informing the user how to run programs with which he may be unfamiliar. Such features would be very helpful to the user both in editing programs and in simplifying their use.

In some conventional programmable calculators a program stored within the calculator may be edited by single stepping forward through the program while viewing an output display representing the last-encountered program step and its associated address and, in one case, also the presently-encountered program step and its associated address. However, these calculators typically cannot single step backward through the program or display the next program step to be encountered and its associated address. Moreover, they typically have no provision for inserting program steps into the program without reloading portions of the program and no provision for finding every occurrence of any designated program step. Such features would also be very helpful to the user in editing programs.

Conventional computer systems have or may be programmed to have much more capability than conventional programmable calculators. However, they are larger, more expensive, and less efficient in calculating elementary mathematical functions than conventional programmable calculators. Moreover, a skilled programmer is typically required to utilize them. Due to these factors, conventional computer systems are best suited for handling large amounts of data or making highly iterative or very complex mathematical calculations.

SUMMARY OF THE INVENTION

The principal object of this invention is to provide an improved programmable calculator that has more capability and flexibility than conventional programmable calculators and that is smaller, less expensive, more efficient in calculating elementary mathematical functions, and easier to utilize than conventional computer systems.

Another object of this invention is to provide a programmable calculator in which the user may convert an angular measurement expressed in degrees, minutes, and seconds to the equivalent measurement expressed in decimal degrees, and vice versa.

Another object of this invention is to provide a programmable calculator in which either programs or data stored within the calculator may be separately recorded on an external magnetic record member and, subsequently, separately reloaded back into the calculator therefrom.

Another object of this invention is to provide a programmable calculator in which the user may designate any program stored within the calculator as being secure when it is recorded onto an external magnetic record member for subsequent re-entry into the calculator and in which the user is prevented from re-recording any secure program or obtaining any indication of its individual program steps once it is reloaded into the calculator.

Other and incidental objects of this invention will become apparent from a reading of this specification and an inspection of the accompanying drawings.

These objects are accomplished according to the illustrated preferred embodiment of this invention by employing a keyboard input unit, a magnetic card reading and recording unit, a solid state output display unit, an output printer unit, an input-output control unit, a memory unit and a central processing unit to provide an adaptable programmable calculator having manual operating, automatic operating, program entering, magnetic card reading, magnetic card recording, and alphameric printing modes. The keyboard input unit includes a group of data keys for entering numeric data into the calculator, a group of control keys for controlling the various modes and operations of the calculator and the format of the output display, and a group of definable keys for controlling additional functions that may be added by the user. All of the data keys and nearly all of the control keys may also be employed for programming the calculator, many of the control keys being provided solely for this purpose. The keyboard input unit also includes a group of indicator lights for informing the user of the status of the calculator. These indicator lights and all of the keys are mounted on a front panel of a housing for the calculator.

The magnetic card reading and recording unit includes a reading and recording head, a drive mechanism for driving a magnetic card from an input receptacle in the front panel of the calculator housing past the reading and recording head to an output receptacle in the front panel, and reading and recording drive circuits coupled to the reading and recording head for bidirectionally transferring information between the magnetic card and the calculator as determined by the control keys of the keyboard input unit. It also includes a pair of detectors and an associated control circuit for disabling the recording drive circuit whenever a notch is detected in the leading edge of the magnetic card to prevent information recorded on the magnetic card from being inadvertently destroyed. Such a notch may be provided in any magnetic card the user desires to protect by simply pushing out a perforated portion thereof.

The solid state output display unit includes three rows of light emitting diode arrays and associated drive circuits for selectively displaying three separate lines of numeric information. Numeric data may be displayed in either a fixed or a floating point format as determined by the control keys of the keyboard input unit.

The output printer unit includes a stationary thermal printing head with a row of resistive heating elements, a drive circuit for selectively energizing each heating element, and a steppiing mechanism for driving a strip of thermal-sensitive recording paper past the stationary thermal printing head in seven steps for each line of alphameric information to be printed out. Every alphabetic and numeric character and many other symbols may be printed out individually or in messages as determined by the control keys of the keyboard input unit or by a program stored within the calculator.

The input-output control unit includes a sixteen-bit universal shift register serving as an input-output register into which information may be transferred serially from the central processing unit or in parallel from the keyboard input and magnetic card reading and recording units and from which information may be transferred serially to the central processing unit or in parallel to the keyboard indicator lights and to the solid state output display, magnetic card reading and recording, and output printer units. It also includes control logic responsive to the central processing unit for controlling the transfer of information between these units. The input-output control unit may also be employed to perform the same functions between the central processing unit and peripheral units including, for example, a digitizer, a marked card reader, an X-Y plotter, a magnetic tape unit, and a typewriter. A plurality of peripheral units may be connected at the same time to the input-output control unit by simply plugging interface modules associated with the selected peripheral units into receptacles provided therefore in a rear panel of the calculator housing.

The memory unit may employ both direct and indirect decimal and symbolic addressing. It includes a modular random-access read-write memory having a program storage section for storing a plurality of program steps and having a separate data storage section including a plurality of working registers, a plurality of associated display registers, and a plurality of storage registers for manipulating and storing data. These program and data storage sections of the read-write memory may be separately expanded without increasing the overall dimensions of the calculator by the addition of program storage modules or by the alteration of the data storage memory control. Additional read-write memory made available to the user is automatically accommodated by the calculator, and the user is automatically informed when the program or data storage capacity of the read-write memory has been exceeded.

The memory unit also includes a modular read-only memory in which routines and subroutines of basic instructions for performing the various functions of the calculator are stored. These routines and subroutines of the read-only memory may be expanded and adapted by the user to perform additional functions oriented toward the specific needs of the user. This is accomplished by simply plugging additional read-only memory modules into receptacles provided therefor in the top panel of the calculator housing. Added read-only memory modules are automatically accommodated by the calculator and may be associated with the definable keys of the keyboard input unit or employed to expand the operations associated with other keys. An overlay is employed with each added read-only memory module associated with the definable keys of the keyboard input unit to identify the additional functions that may then be performed by the calculator.

Plug-in read-only memory modules including, for example, an alpha module, a mathematics module, a statistics module, a definable functions module, and a typewriter module may be added to the read-only memory. The alpha module enables the calculator to print out every alphabetic character individually or in messages. It employs addressing enabling it to redefine most of the keys of the keyboard input unit so that it may be employed at the same time as other plug-in read-only memory modules. The mathematics module enables the calculator to perform trigonometric functions, coordinate transformations, vector arithmetic, and many other mathematical functions. Similarly, the statistics module enables the calculator to perform random number generations, accumulations of sums, sums of products and sums of squares for up to five variables, linear and multiple linear regressions, and many other statistical functions. It also permits the use of a correct key, included among the definable keys of the keyboard input unit, to automatically delete data from a statistical analysis. The definable functions module enables the user to store programs of his own choosing in the program storage section of the read-write memory, associate them with some of the definable keys of the keyboard input unit, and protect them from subsequently being inadvertently altered or destroyed. It also permits the use of an insert key and a find key, included among the definable keys of the keyboard input unit, to insert program steps in a program stored in the read-write memory and to find every occurrence of any designated program step in the stored program. The typewriter module enables the calculator to control the entire keyboard of a properly interfaced typewriter.

The memory unit further includes a pair of recirculating sixteen-bit serial shift registers. One of these registers serves as a memory address register for serially receiving information from an arithmetic-logic unit included in the central processing unit, for parallel addressing any memory location designated by the received information, and for serially transferring the received information back to the arithmetic-logic unit. The other of these registers serves as a memory access register for serially receiving information from the arithmetic-logic unit, for writing information in parallel into any addressed memory location, for reading information in parallel from any addressed memory location, and for serially transferring information to the arithmetic-logic unit. It also serves as a four-bit parallel shift register for transferring four bits of binary-coded-decimal information in parallel to the arithmetic-logic unit.

The central processing unit includes four recirculating sixteen-bit serial shift registers, a four-bit serial shift register, the arithmetic logic unit, a programmable clock, and a microprocessor. Two of these sixteen-bit serial shift registers serve as accumulator registers for serially receiving information from and serially transferring information to the arithmetic-logic unit. The accumulator register employed is designated by a control flip-flop. One of the accumulator registers also serves as a four-bit parallel shift register for receiving four bits of binary-coded-decimal information in parallel from and transferring four bits of such information in parallel to the arithmetic-logic unit. The two remaining sixteen-bit serial shift registers serve as a program counter register and a qualifier register, respectively. They are also employed for serially receiving information from and serially transferring information to the arithmetic-logic unit. The four-bit serial shift register serves as an extend register for serially receiving information from either the memory access register or the arithmetic-logic unit and for serially transferring information to the arithmetic-logic unit.

The arithmetic-logic unit is employed for performing one-bit serial binary arithmetic, four-bit parallel binary-coded-decimal arithmetic, and logic operations. It may also be controlled by the microprocessor to perform bidirectional direct and indirect arithmetic between any of a plurality of the working registers and any of the storage registers of the data storage section of the read-write memory.

The programmable clock is employed to supply a variable number of shift clock pulses to the arithmetic-logic unit and to the serial shift registers of the input-output, memory, and central processing units. It is also emlployed to supply clock control signals to the input-output control logic and to the microprocessor.

The microprocessor includes a read-only memory in which a plurality of microinstructions and codes are stored. These microinstructions and codes are employed to perform the basic instructions of the calculator. They include a plurality of coded and non-coded microinstructions for transferring control to the input-output control logic, for controlling the addressing and accessing of the memory unit, and for controlling the operation of the two accumulator registers, the program counter register, the extend register and the arithmetic-logic unit. They also include a plurality of clock codes for controlling the operation of the programmable clock, a plurality of qualifier selection codes for selecting qualifiers and serving as primary address codes for addressing the read-only memory of the microprocessor, and a plurality of secondary address codes for addressing the read-only memory of the microprocessor. In response to a control signal from a power supply provided for the calculator, control signals for the programmable clock, and qualifier-control signals from the central-processing and input-output control units, the microprocessor issues the microinstructions and codes stored in the read-only memory of the microprocessor as required to process either binary or binary-coded-decimal information entered into or stored in the calculator.

In the manual operating mode, the calculator is controlled by keycodes sequentially entered into the calculator from the keyboard input unit by the user. The solid state output display unit displays a numeric representation of the contents of three of the working registers and their associated display registers. These working registers and their associated display registers may contain the last-entered numeric operand and two previously entered or calculated numeric operands or results or three previously entered or calculated numeric operands or results. The output printer unit may be controlled by the user to selectively print out a numeric representation of any numeric data entered into the calculator from the keyboard input unit, a numeric representation of any result calculated by the calculator, and a mark distinguishing numeric data entries from calculated numeric results. If the alpha read-only memory module is plugged into the calculator, the output printer unit may also be controlled by the user to print out labels for inputs to and outputs from the calculator and any other alphabetic information that may be desired.

When the calculator is in the manual operating mode, it may also be operated in a key-log alphameric printing mode. The output printer unit then prints out a numeric representation of each keycode as it is entered by the user. If the alpha read-only memory module is plugged into the calculator, the output printer unit also prints out a mnemonic representation of each such keycode.

In the automatic operating mode, the calculator is controlled by automatically obtaining keycodes stored as steps of a program in the program storage section of the read-write memory. During automatic operation of the calculator, data may be obtained from the memory unit as designated by the program or may be entered from the keyboard input unit by the user while the operation of the calculator is stopped for data either by the program or by the user. The solid state output display unit displays the final contents of the three working registers and their associated display registers. This may include the final calculated numeric result and two previously entered or calculated numeric operands or results or three previously entered or calculated numeric operands or results. The output printer unit prints out calculated numeric results and other numeric information designated by the program. If the alpha read-only memory module is plugged into the calculator, the output printer unit also prints out any alphabetic information designated by the program.

When the calculator is in the automatic operating mode, the user may also employ a step program control key of the keyboard input unit to single step forward through the program being executed. This enables the user to check the execution of the program step by step in order to determine whether the program, as entered into the calculator, does in fact carry out the desired sequence of operations.

In the program entering mode, keycodes are sequentially entered by the user into the calculator from the keyboard input unit and are stored as steps of a program in the program storage section of the read-write memory. The program may include sequences of program steps that will be intrepreted, when the program is executed, as alphabetic information to be printed out by the output printer unit if the alpha read-only memory module is plugged into the calculator. This alphabetic information may include labels for inputs to and outputs from the calculator, alphabetic messages for facilitating the use of the program and the operation of the calculator, or any other alphabetic information that may be desired. While the user is entering a program into the calculator in the program entering mode, the solid state output display unit displays a numeric representation of the last-entered program step and its associated address and the addresses of the next two program steps to be entered and the present contents of those addresses.

In the program entering mode, the user may also employ the step program control key and a back step control key of the keyboard input unit, to single step either forward or backward through any sequence of program steps stored in the program storage section of the read-write memory. While the user is single stepping forward or backward through a sequence of program steps, the solid state output display unit displays a numeric representation of the last-encountered program step, the program step presently encountered, the next program step to be encountered, and the addresses of these program steps. If the definable functions read-only memory module is plugged into the calculator, the user may also employ the insert and find keys described above by switching to the manual operating mode. These features greatly facilitate the editing of programs stored in the program storage section of the read-write memory.

When the calculator is in the program entering mode, it may also be operated in a key-log alphameric printing mode. The output printer unit then prints out a numeric representation of each program step and its associated address as it is entered into the calculator from the keyboard input unit by the user. If the alpha read-only memory module is plugged into the calculator, the output printer unit also prints out a mnemonic representation of each such program step.

When the calculator is in the program entering mode, it may also be operated in a list alphameric printing mode. The output printer unit then prints out a numeric representation of every program step then stored in the program storage section of the read-write memory and a numeric representation of the addresses of those program steps. If the alpha read-only memory module is plugged into the calculator, the output printer unit also prints out a mnemonic representation of each such program step.

In the magnetic card reading mode, the magnetic card reading and recording unit may be employed by the user to separately load either data or programs into the calculator from one or more external magnetic cards. Data and programs so loaded are separately stored in the data storage and program storage sections of the read-write memory.

In the magnetic card recording mode, the magnetic card reading and recording unit may be employed by the user to separately record either data or programs, separately stored in the data storage and program storage sections of the read-write memory, onto one or more external magnetic cards. Programs stored in the program storage section of the read-write memory may be coded by the user as being secure when they are recorded onto one or more external magnetic cards. The calculator detects such programs when they are reloaded into the calculator and prevents the user from re-recording them or obtaining any listing or other indication of the individual program steps.

DESCRIPTION OF THE DRAWINGS

The following figures have been numbered in correspondence with the same figures of U.S. Pat. No. 3,859,635, cited above as being incorporated herein by reference.

DESCRIPTION OF THE PREFERRED EMBODIMENT

GENERAL DESCRIPTION

Figure 1:
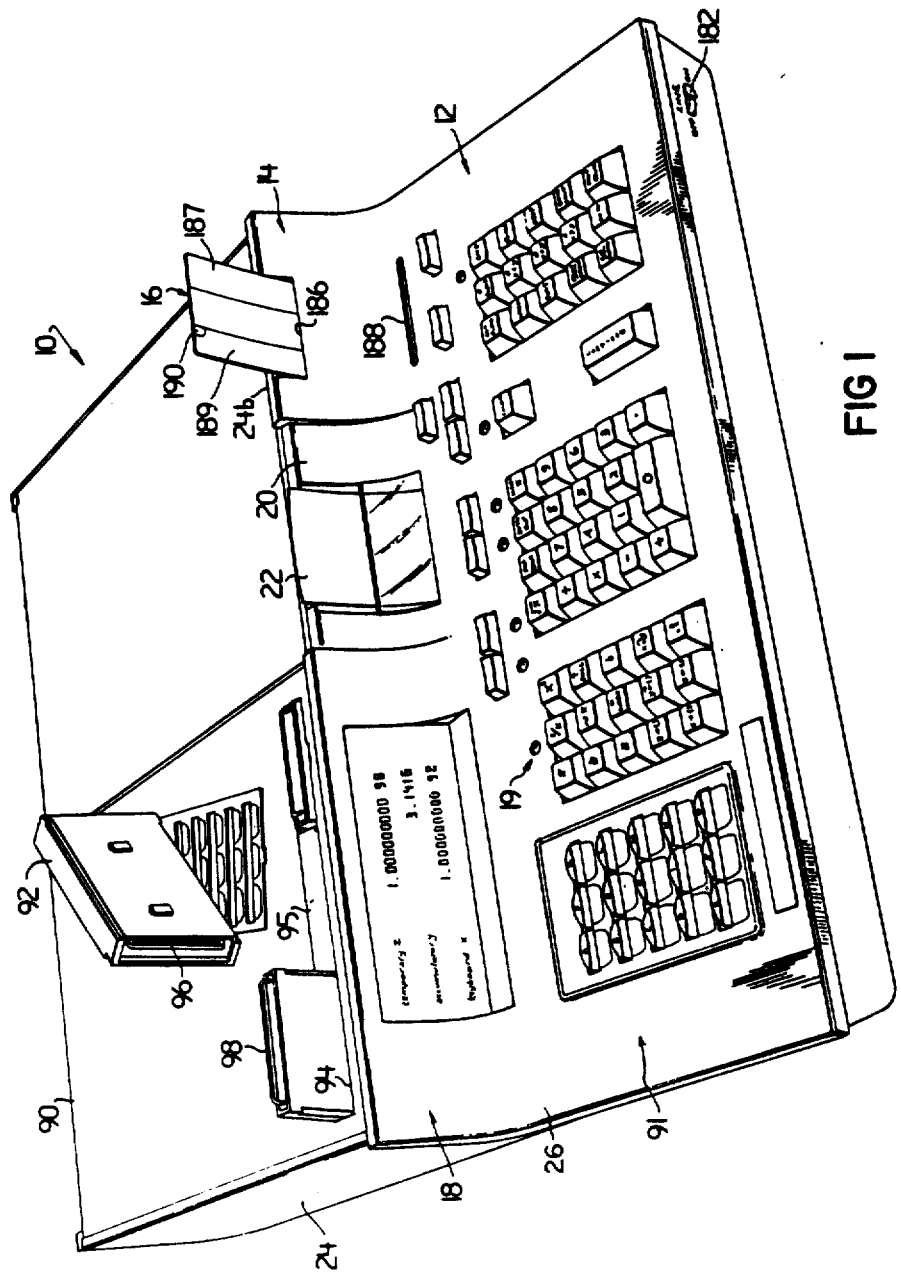
FIG. 1 is a front perspective view of an adaptable programmable calculator according to the preferred embodiment of this invention.

Referring to FIG. 1, there is shown an adaptable programmable calculator 10 including both a keyboard input unit 12 for entering information into and controlling the operation of the calculator and a magnetic card reading and recording unit 14 for recording information stored within the calculator onto one or more external magnetic cards 16 and for subsequently loading the information recorded on these and other similar magnetic cards back into the calculator. The calculator also includes a solid state output display unit 18 for displaying three lines of numeric information stored within the calculator and a group of indicator lights 19, serving as part of the keyboard input unit, for indicating the status of the calculator. It may also include an output printer unit 20 for printing out alphameric information on a strip of thermal-sensitive recording paper 22. All of these input and output units are mounted within a single calculator housing 24 adjacent to a curved front panel 26 thereof.

Figure 3A:
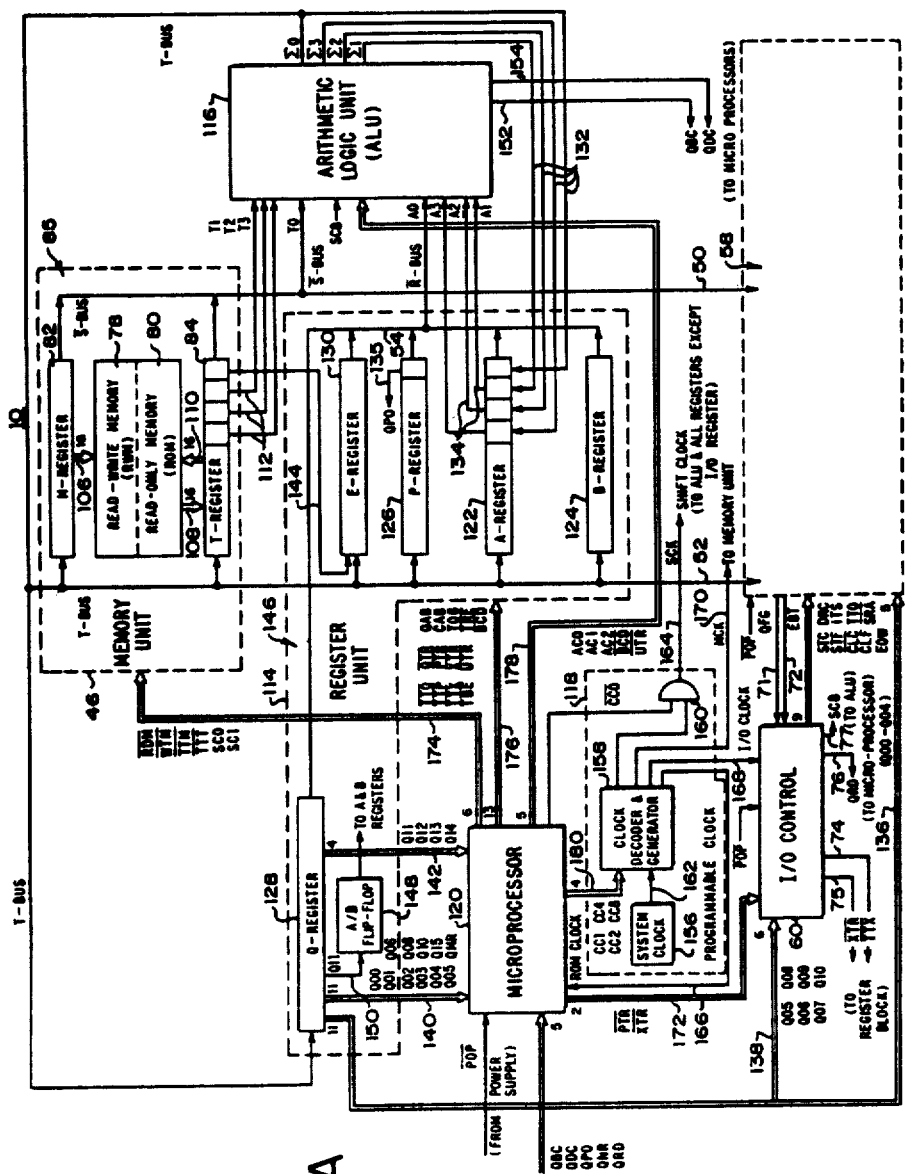
FIGS. 3A-B are simplified block diagrams of the adaptable programmable calculator of FIG. 1.
Figure 3B:
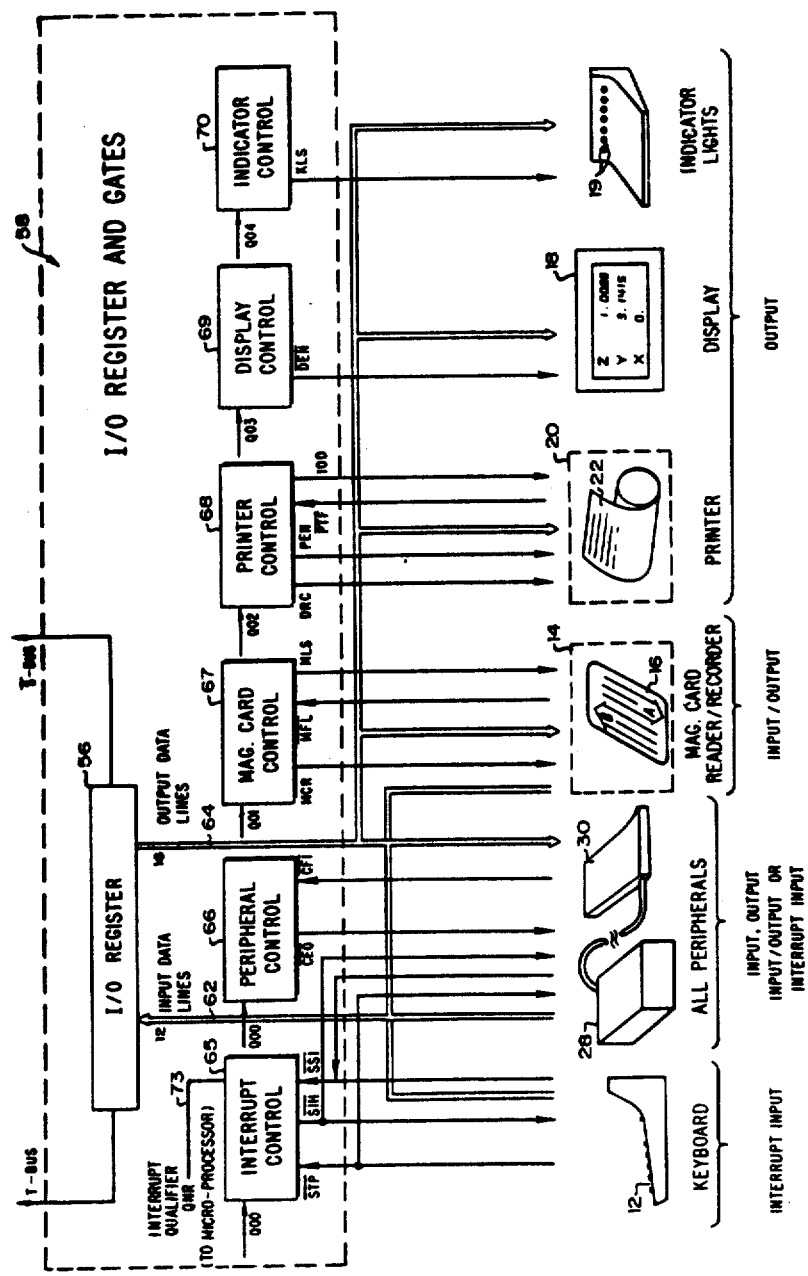

Referring to the simplified block diagram shown in FIGS. 3A-B, it may be seen that the calculator also includes an input-output control unit 44 (hereinafter referred to as the I/O control unit) for controlling the transfer of information to and from the input and output units, a memory unit 46 for storing the manipulating information entered into the calculator and for storing routines and subroutines of basic instructions performed by the calculator, and a central processing unit 48 (hereinafter referred to as the CPU) for controlling the execution of the routines and subroutines of basic instructions stored in the memory unit as required to process information entered into or stored within the calculator. The calculator also includes a bus system comprising an S̄-bus 50, a T-bus 52, and an R̄-bus 54 for transferring information from the memory and I/O control units to the CPU, from the CPU to the memory and I/O control units, and between different portions of the CPU. It further comprises a power supply for supplying DC power to the calculator and peripheral units employed therewith and for issuing a control signal $\overline{POP}$ when power is supplied to the calculator.

The I/O control unit 44 includes an input-output register 56 (hereinafter referred to as the I/O register), associated I/O gating control circuitry 58, and input-output control logic 60 (hereinafter referred to as the I/O control). I/O resister 56 comprises a universal sixteen-bit shift register into which information may be transferred either bit-serially from CPU 48 via T-bus 52 or in parallel from keyboard input unit 12, magnetic card reading and recording unit 14, and peripheral input units 28 such as the marked card reader via twelve input party lines 62. Information may also be transferred from I/O register 56 either bit-serially to CPU 48 via S-bus 50 or in parallel to magnetic card reading and recording unit 14, solid state output display unit 18, indicator lights 19, output printer unit 20, and peripheral output units 28 such as the X-Y plotter or the typewriter via sixteen output party lines 64.

I/O gating control circuitry 58 includes control circuits for controlling the transfer of information into and out of I/O register 56 in response to selected I/O qualifier control signals from CPU 48 and selected I/O control instructions from I/O control 60. It also includes an interrupt control circuit 65, a peripheral control circuit 66, a magnetic card control circuit 67, a printer control circuit 68, a display control circuit 69, and an indicator control circuit 70 for variously controlling the input and output units and issuing control signals QFG and EBT to I/O control 60 via two output lines 71 and 72. These last mentioned control circuits variously perform their control functions in response to control signal $\overline{POP}$ from the power supply, I/O qualifier control signals from CPU 48, I/O control instructions from I/O control 60, and control signals from keyboard input unit 12. Interrupt control circuit 65 initiates the transfer of information into I/O register 56 from keyboard input unit 12 or interrupting peripheral input units 28 such as the marked card reader and issues a qualifier control signal QNR to CPU 48 via output lines 73. Peripheral control circuit 66 enables interface modules 30 plugged into the calculator to respond to information from I/O register 56, control associated peripheral units 28, transfer information to and/or receive information from associated peripheral units 28, and in some cases initiate the transfer of information to I/O register 56 from the interface modules themselves. Magnetic card control circuit 67 enables magnetic card reading and recording unit 14 to respond to information in I/O register 56 and either read information into I/O register 56 from a magnetic card 16 or record information onto a magnetic card 16 from I/O register 56. Printer control circuit 68, display control circuit 69, and indicator control circuit 70 enable output display unit 18, output printer unit 20, and indicator lights 19, respectively, to respond to information from I/O register 56.

When a basic I/O instruction obtained from memory unit 46 is to be executed, CPU 48 transfers control to I/O control 60 by issuing a pair of I/O microinstructions $\overline{PTR}$ and $\overline{XTR}$ thereto. In response to these I/O microinstructions from CPU 48, control signal $\overline{POP}$ from the power supply, control signals QFG and EBT from I/O gating control circuitry 58, and I/O qualifier and clock control signals from CPU 48, I/O control 60 selectively issues one or more I/O control instructions to gating control circuitry 58 as required to execute the basic I/O instruction designated by CPU 48 and issues control signals $\overline{TTX}$, $\overline{XTR}$, QRD, and SCB to CPU 48 via output lines 74–77. The I/O qualifier control signals issued to I/O control 60 and gating control circuitry 58 by CPU 48 are derived from the basic I/O instruction to be executed. Those qualifier control signals issued to I/O control 60 designate the specific I/O control instructions to be issued by I/O control 60, while those issued to gating control circuitry 58 designate selected control circuits to be employed in executing the basic I/O instruction.

Memory unit 46 includes a modular random-access read-write memory 78 (hereinafter referred to as the RWM), a modular read-only memory 80 (hereinafter referred to as the ROM), a memory address register 82 (hereinafter referred to as the M-register), a memory access register 84 (hereinafter referred to as the T-register), and control circuitry 85 for these memories and registers. RWM 78 and ROM 80 comprise MOS-type semiconductor memories. The basic RWM 78 contains a data storage section 86 of 512 sixteen-bit words extending from address 1000 to address 1777 on page 0 and a separate program storage section 88 of 512 six-bit words extending from address 12000 to address 12777 on page 5. All addresses on the memory map are represented in octal form.

Data storage section 86 contains 49 four-word storage registers available to the user (as user addresses 000–048) for manipulating and storing data, 60 additional four-word storage registers that may be made available to the user (as user addresses 049–108) for the same purpose, and 76 words dedicated for use by CPU 48. The 60 additional four-word storage registers may be made available to the user by altering a control routine in the ROM section 80. This is accomplished by removing a top panel 90 of the calculator housing shown in FIG. 1, removing a printed circuit board containing the control routine to be altered, and substituting another printed circuit board containing the altered control routine. Additional data storage modules made available to the user are automatically accommodated by the calculator.

Routines and subroutines of basic instructions for performing the basic functions of the calculator and constants employed by these routines and subroutines are stored in these portions of ROM 80. An additional 3,072 sixteen-bit words of ROM may also be added on pages 1, 3, and 4 in steps of 512 and 1,024 words. This is accomplished by simply inserting plug-in ROM modules 92 into receptacles 94 provided therefor in top panel 90 of the calculator housing as illustrated in FIG. 1 by the partially-inserted plug-in ROM module on the left. As each plug-in ROM module 92 is inserted into one of these receptacles a spring-loaded door 95 at the entrance of the receptacle swings down allowing passage of the plug-in ROM module. Once the plug-in ROM module is fully inserted as illustrated by the plug-in ROM module on the right, a printed circuit terminal board 96 contained within the plug-in ROM module plugs into a mating edge connector mounted inside the calculator. A handle 98 pivotally mounted at the top end of each plug-in ROM module 92 facilitates removal of the plug-in ROM module once it has been fully inserted into one of the receptacles 94.

Routines and subroutines of basic instructions (and any needed constants) for enabling the calculator to perform many additional functions are stored in each plug-in ROM module 92. The user himself may therefore quickly and simply adapt the calculator to perform many additional functions oriented toward his specific needs by simply plugging ROM modules of his own choosing into the calculator. Added plug-in ROM modules are automatically accommodated by the calculator and associated with definable section 91 of keyboard input unit 12 or employed to expand the functions performed by this and other sections of the keyboard input unit.

Referring again to FIGS. 3A-B, M-register 82 of the memory unit comprises a recirculating sixteen-bit serial shift register into which information may be transferred bit-serially from CPU 48 via T-bus 52 and out of which information may be transferred bit-serially to CPU 48 via S̄-bus 50. Information shifted into M-register 82 may be employed to address any word in RWM 78 or ROM 80 via fifteen output lines 106.

T-register 84 of the memory unit comprises a recirculating sixteen-bit serial shift register into which information may be transferred either bit-serially from CPU 48 via T-bus 52 or parallel from any addressed word in RWM 78 and ROM 80 via sixteen parallel input lines 108. Information may be transferred from T-register 104 either bit-serially to CPU 48 via S̄-bus 50 or in parallel to any addressed word in RWM 78 via sixteen parallel output lines 110. The four least significant bits of information contained in T-register 104 may comprise binary-coded-decimal information and may be transferred from the T-register in parallel to CPU 48 via three parallel output lines 112 taken with S̄-bus 50.

The control circuitry 85 of the memory unit controls these transfers of information into and out of M-register 82 and T-register 84, controls the addressing and accessing of RWM 78 and ROM 80, and refreshes RWM 78. It performs these functions in response to memory microinstructions, memory clock pulses, and shift clock pulses from CPU 48.

CPU 48 includes a register unit 114, an arithmetic-logic unit 116 (hereinafter referred to as the ALU), a programmable clock 118, and a microprocessor 120. Register unit 114 comprises four recirculating sixteen-bit shift registers 122, 124, 126, and 128 and one four-bit shift register 130. Shift registers 122 and 124 serve as sixteen-bit serial accumulator registers (hereinafter referred to as the A-register and the B-register, respectively) into which information may be transferred bit-serially from ALU 116 via T-bus 52 and out of which information may be transferred bit-serially to ALU 116 via R̄-bus 54. The four least significant bit positions of A-register 122 also serve as a four-bit parallel accumulator register into which four bits of binary-coded-decimal information may be transferred in parallel from ALU 116 via four parallel input lines 132 and out of which four bits of binary-coded-decimal information may also be transferred in parallel to ALU 116 via three parallel output lines 134 taken with R̄-bus 54.

Shift register 126 serves as a sixteen-bit system program counter (hereinafter referred to as the P-register) into which information may be transferred bit-serially from ALU 116 via T-bus 52 and out of which information may be transferred bit-serially to ALU 116 via R̄-bus 54. Information contained in the least significant bit position of P-register 126 may also be transferred as a qualifier control signal QPO to microprocessor 120 via output line 135.

Shift register 128 serves as a sixteen-bit qualifier register (hereinafter referred to as the Q-register) into which information may be transferred bit-serially from ALU 116 via T-bus 52 and out of which information may be transferred bit-serially to ALU 116 via R̄-bus 54. Information contained in the five least-significant bit positions of Q-register 128 is transferred to I/O gating control circuitry 58 as five one-bit I/O qualifier control signals Q00–Q04 via five parallel output lines 136, and information contained in the six next-least-significant bit positions of the Q-register is transferred to I/O control 60 as six one-bit I/O qualifier control signals Q05–Q10 via six parallel output lines 138. Similarly, information contained in the seven least-significant, the ninth and eleventh least-significant, and the most-significant bit positions of Q-register 128 and information derived from the thirteenth, fourteenth, and fifteenth bit positions of the Q-register may be transferred to microprocessor 120 as eleven one-bit microprocessor qualifier control signals Q00–Q06, Q08, Q10, Q15, and QMR via eleven output lines 140. Information contained in the twelfth through the fifteenth least-significant bit positions of Q-register 128 may be transferred to microprocessor 120 as a four-bit primary address code via four parallel output lines 142.

Shift register 130 serves as a four-bit serial extend register (hereinafter referred to as the E-register) into which information may be transferred bit-serially either from ALU 116 via T-bus 52 or from the least-significant bit position of T-register 84 via input line 144. Information may also be transferred out of E-register 130 to ALU 116 via R̄-bus 54.

Register unit 114 also includes control circuitry 146 for controlling the transfer of parallel binary-coded-decimal information into and out of A-register 122 and the transfer of serial binary information into and out of A-register 122, B-register 124, P-register 126, Q-register 128, and E-register 130. This is accomplished in response to register microinstructions from microprocessor 120, control signals T̄T̄X̄ and X̄T̄R̄ from I/O control 60, and shift clock control pulses from programmable clock 118. Control circuitry 146 includes a flip-flop 148 (hereinafter referred to as the A/B flip-flop) for enabling the transfer of information into and out of either the A-register 122 or the B-register 124 as determined by the state of the A/B flip-flop. The state of A/B flip-flop 148 is initially determined by information Q11 transferred to the A/B flip-flop from the twelfth least-significant bit position of Q-register 128 but may be subsequently complemented one or more times by microinstruction CAB from microprocessor 120.

ALU 116 may perform either one-bit serial binary arithmetic on data received from T-register 84 or M-register 82 via S̄-bus 50 and/or from any register of register unit 114 via R̄-bus 54 or four-bit parallel binary-coded-decimal arithmetic on data received from T-register 84 via output lines 112 taken with S̄-bus 50 and/or from A-register 122 via output lines 134 taken with R̄-bus 54. It may also perform logic operations on data received from memory unit 46 and/or register unit 114 via any of these lines. The arithmetic and logic operations performed are designated by ALU microinstructions from microprocessor 120 and are carried out in response to these microinstructions, shift clock control pulses from programmable clock 118, and control signal SCB from I/O control 60. Information is also transferred from ALU 116 to A-register 122 via output lines 132 or to I/O register 56, M-register 82, T-register 84, or any register of register unit 114 via T-bus 52 in response to microinstructions and control signals applied to these registers. If a carry results while ALU 116 is performing either one-bit serial binary arithmetic or four-bit parallel binary-coded-decimal arithmetic, the ALU issues a corresponding qualifier control signal QBC and QDC to microprocessor 120 via one of two output lines 152 and 154.

Programmable clock 118 includes a crystal-controlled system clock 156, a clock decoder and generator 158, and a control gate 160. System clock 156 issues regularly recurring clock pulses to clock decoder and generator 158 via output line 162. In response to these regularly recurring clock pulses from system clock 156 and to four-bit clock codes from microprocessor 120, clock decoder and generator 158 issues trains of n shift clock pulses to ALU 116, M-register 82, T-register 82, and all of the registers of register unit 114 via output line 164. These trains of n shift clock pulses are employed for shifting a corresponding number of bits of serial information into or out of any of these registers or for shifting a carry bit in the ALU. The number n of pulses in each of these trains may vary from one to sixteen as determined by the number of bits of serial information required during each operation to be performed. In response to a control signal $\overline{CCO}$ from microprocessor 120, control gate 160 prevents any shift clock pulses from being applied to the ALU or any of these registers. Upon completion of each train of n shift clock pulses, clock decoder and generator 158 issues a ROM clock pulse to microprocessor 120 via output line 166 and an I/O clock pulse to I/O control 60 via output line 168. In response to the regularly recurring clock signal from system clock 56, clock decoder and generator 158 also issues correspondingly regularly recurring memory clock pulses to memory unit 46 via output line 170.

Microprocessor 120 selectively issues two I/O microinstructions to I/O control 60 via two output lines 172, six memory microinstructions to memory unit 46 via six output lines 174, thirteen register microinstructions to register unit 114 via thirteen output lines 176, and five ALU microinstructions to ALU 116 via five output lines 178. It also issues a four-bit clock code associated with each of these microinstructions to clock decoder 158 via four output lines 180. These microinstructions and associated clock codes are issued as determined by the control signal $\overline{POP}$ from the power supply, the eleven microprocessor qualifier control signals from Q-register 128, the four-bit primary address codes from Q-register 128, and the five microprocessor qualifier control signals from I/O control 60, interrupt control 65, ALU 116, and P-register 126.

KEY OPERATIONS

All operations performed by the calculator may be controlled or initiated by the keyboard input unit and/or by keycodes entered into the calculator from the keyboard input unit, the magnetic card reading and recording unit, or peripheral input units such as the marked card reader and stored as program steps in the program storage section of the RWM. The calculator responds to keycodes in basically the same mannor whether obtaining them from the keyboard input unit or from the program storage section of the RWM. An operational description of the keyboard input unit is therefore now given with specific reference to FIG. 1, except as otherwise indicated.

Mode Keys (RUN, PRGM, KEY LOG)

When the calculator is first turned on, it is automatically initialized and placed in a manual operating mode. If the calculator is switched to some other operating mode, it may subsequently be placed in the manual operating mode again by simply depressing the RUN mode key. In the manual operating mode, operation of the calculator is manually controlled by the user from the keyboard input unit. During this mode the output display unit displays a decimal numeric representation of the contents of the x-, y-, and z-registers (or of associated memory registers in which the actual or intended contents of the x-, y-, and z-registers are temporarily stored and, for simplicity of description, are then considered to be the contents of the x-, y-, and z-registers). The contents of the x-, y-, and z-registers are displayed adjacent to the corresponding register designators "keyboard x", "accumulator y", and "temporary z", respectively, in the display window. Depression of the RUN mode key also conditions the calculator for operation in an automatic operating mode, a first keylog printing mode, a program-list printing mode, a magnetic card reading mode, and a magnetic card recording mode as determined by other keys hereinafter explained. A run indicator light 19 positioned immediately below the RUN mode key is turned on when the calculator is operating in any of the RUN modes.

The PRGM mode key is depressed to place the calculator in a program entering mode. In this mode keycodes sequentially entered by the user from the keyboard input unit are stored as program steps in successive program-step registers of the program storage section of the RWM as specified by the user program counter. As described above, 500 program-step registers (user addresses 0000–0499) are available, and 1536 additional program-step registers (user addresses (0500–2035) may be made available, to the user for this purpose. The program step register into which each program step is to be stored and from which each program step is to be obtained in any program-related operation is always specified by the user program counter. Thus, before entering a program or subprogram into the calculator, the user program counter must be set to the address of the program step register into which it is desired to store the initial program step of the program or subprogram to be entered (this address is hereinafter referred to as the desired starting address nnnn of the program). This may be accomplished, when the calculator is in a keyboard-controlled run mode, by depressing the GO TO key followed by the decimal-digit keys 0–9 specifying the desired starting address nnnn of the program. If the desired starting address is 0000, this may also be accomplished, when the calculator is in the manual operating mode by simply depressing the END key.

Once the user program counter is set to the desired starting address nnnn, the user may proceed to enter the program or subprogram by sequentially performing basically the same key operations that he would normally perform in the manual operating mode. Thus no special language need be learned to program the calculator. During the program entering mode the output display unit displays a decimal numeric representation of the last-entered program step and its associated address and the addresses of the next two program steps to be entered and the present contents of those addresses.

Depression of the PRGM mode key also conditions the calculator for operation in a second key-log printing mode and the program-list printing mode as determined by other keys hereinafter explained. A program mode indicator light 19 positioned immediately below the PRGM mode key is turned on when the calculator is operating in any of the PRGM modes.

The KEY LOG mode key is depressed, when the calculator is in the manual operating mode, to place the calculator in the first key-log printing mode. In this mode, the output printer unit prints out an octal numeric representation of each keyboard operation as it is performed by the user. This provides a permanent record of all keyboard operations (including regular data print-out operations), as illustrated by the following example:

| Keyboard entry | Key log |
|---|---|
| 1 | 01 |
| 2 | 02 |
| ↑ | 27 |
| 3 | 03 |
| 4 | 04 |
| + | 33 |
| 5 | 05 |
| ÷ | 35 |
| PRINT | 45 |
| SPACE | |
| | 5.00000 |

If the alpha ROM module enabling the calculator to print out every alphabetic character and many symbols individually or in messages is plugged into the calculator, the output printer unit also prints out a mnemonic representation of each keyboard operation as it is performed by the user. This is illustrated by the following example:

| Keyboard entry | Key log | |
|---|---|---|
| 1 | 1 | 01 |
| 2 | 2 | 02 |
| ↑ | UP | 27 |
| 3 | 3 | 03 |
| 4 | 4 | 04 |
| + | + | 33 |
| 5 | 5 | 05 |
| ÷ | DIV | 35 |
| PRINT | PNT | 45 |
| SPACE | | |
| | | 5.00000 |

In the first key-log printing mode the output display unit displays the same information as during the manual operating mode.

The KEY LOG mode key is depressed, when the calculator is in the program entering mode, to place the calculator in the second key-log printing mode. In this mode the output printer unit prints out an octal numeric representation of each keycode as it is entered into the calculator from the keyboard input unit and a decimal numeric representation of the address at which each such keycode is stored as a program step in the program storage section of the RWM. This provides a permanent record of all keyboard-entered program steps, as illustrated by the following example:

| Keyboard entry | Key log |
|---|---|
| CLEAR | 0000 - - - - - - - - 20 |
| 1 | 0001 - - - - - - - - 01 |
| 2 | 0002 - - - - - - - - 02 |
| ↑ | 0003 - - - - - - - - 27 |
| 3 | 0004 - - - - - - - - 03 |
| 4 | 0005 - - - - - - - - 04 |
| + | 0006 - - - - - - - - 33 |
| 5 | 0007 - - - - - - - - 05 |
| x⇄y | 0008 - - - - - - - - 30 |
| PRINT SPACE | 0009 - - - - - - - - 45 |
| STOP | 0010 - - - - - - - - 41 |
| END | 0011 - - - - - - - - 46 |

If the alpha ROM module is plugged into the calculator, the output printer unit also prints out a mnemonic representation of each keyboard-entered program step. This is illustrated by the following example:

| Keyboard entry | Key log |
|---|---|
| CLEAR | 0000 - - CLR - - - 20 |
| 1 | 0001 - -  1  - - - 01 |
| 2 | 0002 - -  2  - - - 02 |
| ↑ | 0003 - - UP - - - 27 |
| 3 | 0004 - -  3  - - - 03 |
| 4 | 0005 - -  4  - - - 04 |
| + | 0006 - -  +  - - - 33 |
| 5 | 0007 - -  5  - - - 05 |
| x⇄y | 0008 - - XEY - - - 30 |
| PRINT | 0009 - - PNT - - - 45 |
| STOP | 0010 - - STP - - - 41 |
| END | 0011 - - END - - - 46 |

In the second key-log printing mode the output display unit displays the same information as during the program entering mode.

The KEY LOG mode key is a toggling on-off key (i.e. repeated depressions of the key alternately switch the calculator in and out of either the first or the second key-log printing mode). A key-log indicator light 19 positioned immediately below the KEY LOG mode key is turned on when the calculator is operating in either key-log printing mode.

Program Keys (LIST, LOAD, RECORD)

The LIST program key is depressed, when the calculator is in the manual operating mode, first key-log printing mode, second key-log printing mode, or program entering mode, to place the calculator in the program-list printing mode. In this mode, the output printer unit prints out an octal numeric representation of keycodes then stored as program steps in the program storage section of the RWM and a decimal numeric representation of the addresses of these program steps. These program steps and addresses are printed out in a list beginning with the address initially specified by the user program counter and ending with the address specified by the user program counter when an END program step is encountered or the STOP key is depressed. The user may select the starting address nnnn of the list by depressing the GO TO key followed by the decimal digit keys (0–9) designating the desired starting address nnnn, or simply by depressing the END key if the starting address is 0000. Similarily, the user may terminate the list at any time by depressing the STOP key. When the program-list operation is terminated either by an END program step or by depression of the STOP key, the calculator reverts to its original manual operating, first or second key-log printing, or program entering mode. If the program-list operation is terminated by an END program step, the user program counter specifies the address of the END program step. However, if the program-list operation is terminated by depression of the STOP key, the user program counter specifies the address of the next program step to have been encountered had the STOP key not been depressed.

The list printed out by the output printer unit serves as a permanent record of a sequence of program steps stored as a program, subprogram, or part thereof in the program storage section of the RWM and the address of these program steps. A typical list is illustrated by the right- and left-hand columns of numbers printed out on the strip of thermal-sensitive recording paper 22. If the alpha ROM module is plugged into the calculator, the output printer unit also prints out a mnemonic representation of each of these program steps. This is illustrated by the central column of alphameric characters printed out on the same strip of thermal-sensitive recording paper.

The LOAD program key is depressed, when the calculator is in the manual operating mode or the first key-log printing mode, to place the calculator in the magnetic card reading mode. During this mode, program steps recorded on one or more external magnetic cards 16 are read by the magnetic card reading and recording unit and stored in the program storage section of the RWM. In order to properly accomplish this program loading operation:

1. The user program counter is set to the desired starting address nnnn of the program storage section to be loaded. This may be accomplished by depressing the GO TO key followed by those decimal degit keys designating the desired starting address nnnn, or simply by depressing the END key if the desired starting address is 0000.

2. A recorded magnetic card 16 inserted into an input receptacle 186 of the magnetic card reading and recording unit with the first side 187 to be read placed in the operative reading and recording position as shown in FIG. 1.

3. The LOAD key is depressed, thereby causing the magnetic card reading and recording unit to begin reading the first recorded side of the magnetic card and turning on an INSERT CARD indicator light 19 positioned immediately below and between the LOAD and RECORD program keys. This program reading operation will terminate and the INSERT CARD indicator light will turn off when an END (i.e. terminating) program step is read. The calculator will thereupon revert to the original manual operating or first key-log printing mode with the user program counter specifying the address of the END program step. In any case, the magnetic card will be partially ejected at an output receptacle 188 of the magnetic card reading and recording unit after each reading pass has been completed.

4. If the INSERT CARD indicator light remains on and the magnetic card reading and recording unit continues to run, the partially ejected magnetic card is retrieved from output receptacle 188, turned around, and the same magnetic card (or another magnetic card, as appropriate) inserted into input receptacle 186 with the next side 189 to be read placed in the operative reading and recording position. The magnetic card reading and recording unit thereupon begins reading this next recorded side. This program reading operation is repeated, if necessary, until it is terminated by reading an END program step. If desired, program reading operation may also be terminated by depressing the STOP key. The calculator will thereupon also revert to the original manual operating or first key-log printing mode, but with the user program counter specifying the address of the next program step to have been read and loaded into the program storage section of the RWM had the program reading operation not been so terminated.

When the program reading operation is terminated by an END program step, the user program counter is left specifying the address of this END program step so that additional program steps, subprograms, and programs may be chain-loaded into the calculator without extra effort by simply repeating steps 2, 3, and 4 above. The first additional program step will over-write the last encountered END program step thereby leaving only a final END program step at this completion of the composite program. Similarly, when the program reading operation is terminated by depressing the STOP key, the user program counter is also left specifying the address of the next program step to have been read so that additional program steps, subprograms, and programs may also be chain-loaded by simply repeating steps 2, 3, and 4 above.

The RECORD program key is depressed, when the calculator is in the manual operating mode or the first key-log printing mode, to place the calculator in the magnetic card recording mode. During this mode program steps stored in the program storage section of the RWM are recorded on one or more external magnetic cards by the magnetic card reading and recording unit. In order to properly accomplish this program recording operation:

1. The user program counter is set to the starting address nnnn of the stored program to be recorded. This may be accomplished by depressing the GO TO key followed by the decimal digit keys designating the required address nnnn, or simply by depressing the END key if the starting address is 0000.

2. A magnetic card 16 is inserted into input receptacle 186 of the magnetic card reading and recording unit with the first side 187 of the card to be recorded placed in the operative reading and recording position as shown.

3. The RECORD program key is depressed, thereby causing the magnetic card reading and recording unit to begin recording the stored program onto the first side of the magnetic card and turning on the INSERT CARD indicator light 19. This program recording operation will terminate and the INSERT CARD indicator light turn off when an END program step is recorded. The calculator will thereupon revert to the original manual operating or first key-log printing mode with the user program counter specifying the address of the END program step. In any case, the magnetic card will be partially ejected at output receptacle 188 of the magnetic card reading and recording unit after each recording pass has been completed.

4. If the INSERT CARD indicator light remains on, and the magnetic card reading and recording unit continues to run, the partially ejected card is retrieved from output receptacle 188, turned around, and the same magnetic card (or another magnetic card, as appropriate) inserted into input receptacle 186 with the next side 189 to be recorded placed in the operative reading and recording position. The magnetic card reading and recording unit thereupon begins recording on this next side. This program recording operation is repeated, if necessary, until it is terminated by recording an END program step. If no END program step is encountered, the calculator will continue to request more magnetic card recording passes until 2,036 program steps are recorded, regardless of the actual amount of program storage memory installed in the calculator. If desired, the recording operation can be terminated at any time by depressing the STOP key. The calculator will thereupon also revert to the original manual operating or first key-log printing mode but with the user program counter left specifying the address of the next program step to have been recorded had the recording operation not been so terminated.

Once the program is recorded on one or both sides of one or more magnetic cards 16, it may be protected against undesired erasures by punching out a perforated portion 190 at the leading edge of each side on which it is recorded. If a protected (notched) magnetic card is inserted into input receptacle 186 of the magnetic card reading and recording unit and the RECORD key depressed, the STATUS (error) indicator light 19 will turn on and will remain on while the magnetic card reading and recording unit drives the magnetic card to output receptacle 188, whereupon the STATUS light will be extinguished. Nothing will be recorded on the protected magnetic card during this recording pass nor will there be any impairment of the calculator itself or the information previously recorded on the protected magnetic card. The calculator and the magnetic card unit will simply continue to wait for a nonprotected magnetic card to be inserted into input receptacle 186 for the magnetic card reading and recording unit.

Automatic Operation Mode Control Keys (CONTINUE, STOP, END, PAUSE)

The CONTINUE key is depressed, when the calculator is in the manual operating mode or the first key-log printing mode, to start the automatic execution of a program subprogram stored within the program storage section of the RWM. Automatic execution begins at the address specified by the user program counter. Thus, in order to execute a desired program or subprogram stored within the program storage section of the RWM;

1. The user program counter is set to the starting address nnnn of the desired program or subprogram. This is accomplished by depressing the GO TO key followed by those decimal digit keys designating the starting address nnnn of the desired program. If the starting address is 0000, this may be accomplished by simply depressing the END key.

2. The CONTINUE key is depressed, when the calculator is in the manual operating mode or the first key-log printing mode, to place the calculator in the automatic operating mode and begin automatic execution of the stored program or subprogram at the address nnnn specified by the user program counter. Automatic execution will continue until a STOP or END program step is encountered or a STOP key is depressed as described below.

The STOP key is depressed, when the calculator is in the automatic operating mode, to halt the automatic execution of a stored program or subprogram immediately after completion of the program step then being executed. Automatic execution of a stored program or subprogram is similarly halted when a STOP program step is encountered. In either case the calculator will thereupon revert to the original manual operating or first key-log printing mode with the program counter specifying the address of the next program step to be encountered. The user may then operate the calculator in the manual operating mode to enter data required by the program being executed or to perform other calculations. So long as the user does not depress the GO TO or END key or perform some other operation altering the last setting of the user program counter, he may resume automatic operation of the calculator at any time by simply depressing the CONTINUE key again.

As described above, the STOP key may also be depressed, when the calculator is in the program-list printing mode, the magnetic card reading mode, or the magnetic card recording mode to halt the program-list printing operation, the magnetic card reading operation or the magnetic card recording operations, respectively. In each of these cases the calculator will revert to the mode it was in immediately prior to the halted operation with the user program counter specifying the address of the next program step to have been printed, read, or recorded had the STOP key not been depressed.

The END key is depressed, when the calculator is in the manual operating mode, to set the user program counter to address 0000 in the program storage section of the RWM (this is equivalent to depressing the GO TO, 0, 0, 0, and 0 keys). An END program step terminates the automatic execution of a stored program by the calculator and resets the user program counter to the first available address 0000 in the program storage section of the RWM. The calculator thereupon reverts to the original manual operating or first key-log printing mode, from which automatic operation was initiated. Automatic execution may then be resumed by depressing the CONTINUE key, if the desired starting address is 0000 or by repeating steps 1 and 2 described above in connection with the CONTINUE key if the desired starting address is not 0000. An END program step also clears any subroutine return-address to which return has not by then been made. As described above, it also terminates the program listing, magnetic card reading, and magnetic card recording operations.

The PAUSE key is typically used only as a program step. Automatic execution of a stored program or subprogram is automatically halted for a $\frac{1}{4}$ second pause interval whenever a PAUSE program step is encountered or the PAUSE key is depressed. This enables partial results of a calculation to be displayed by the output display unit during automatic execution of the stored program or subprogram. Successive PAUSE program steps may be employed to increase the duration of the pause interval by $\frac{1}{4}$ second increments. Automatic execution of the stored program or subprogram automatically resumes after the pause interval.

A PAUSE program step may also be used as a conditional stop, permitting the user to stop the automatic operation of the calculator immediately after execution of any PAUSE program step. This is accomplished by simply depressing any key (other than STOP) during automatic execution of the program until the PAUSE program step has been executed. In other words, a PAUSE program step immediately followed by depression of any key other than STOP has the same effect as depressing STOP, with the advantage that automatic execution of a stored program or subprogram may thereby be precisely halted at one or more predetermined program steps if the user so desires. Automatic execution of the stored program may then be resumed by depressing the CONTINUE key.

Decimal Display Keys (FLOAT, FIX ())

These keys are employed to control the format of numbers displayed by the output display unit when the calculator is in the manual operating and first key-log printing modes. Either a fixed or a floating decimal point format may be used. A fixed point indicator light 19 positioned immediately below the FIX () key is turned on when the fixed decimal point format is being used. Similarly, a floating point indicator light positioned immediately below the FLOAT key is turned on when the floating decimal point format is being used.

In the fixed decimal point format, numbers appear in the form in which they are most commonly written. The decimal point is fixed in its correct position. In the floating decimal point format, numbers appear in a normalized form with the decimal point located immediately after the most significant non-zero digit of the normalized number. Each normalized number is followed by an exponent comprising a positive or negative power of ten and representing the number of digit places that, and the direction in which, the decimal point must be moved to express the normalized number in the fixed decimal point format. The following examples illustrate the relationship between numbers expressed in both the fixed and floating decimal point formats.

| FIXED DECIMAL POINT FORMAT | | FLOATING DECIMAL POINT FORMAT |
|---|---|---|
| 1234.5 | = | $1.2345 \times 10^3$ |
| 0.0012345 | = | $1.2345 \times 10^{-3}$ |
| −1.2345 | = | $−1.2345 \times 10^0$ |

When the calculator is turned on and automatically initialized, the output display unit displays numbers in the floating decimal point format. If the output display is switched to the fixed decimal point format, it may subsequently be switched back to the floating decimal point format by simply depressing the FLOAT key. Every number displayed in the floating decimal point format includes the sign (if negative) and ten most significant digits of the normalized number followed by the sign (if negative) of the exponent and two exponent digits. This is illustrated by the following examples:

| NUMBERS TO BE DISPLAYED | FLOATING DECIMAL POINT DISPLAY | |
|---|---|---|
| 1234.5 | 1.234500000 | 03 |
| 0.0012345 | 1.234500000 | −03 |
| −1.2345 | −1.234500000 | 00 |

The output display may be changed to the fixed decimal point format by depressing the FIX () key followed by a decimal digit key designating the desired number n (0-9) of digits to be displayed to the right of the decimal point. Less significant digits are not displayed, and the least significant digit to be displayed is rounded up if the nondisplayed next least significant digit is five or greater. This is illustrated by the following examples for different values of n:

| NUMBERS TO BE DISPLAYED | VALUES OF n | FIXED DECIMAL POINT DISPLAY |
|---|---|---|
| 123.456784 | 2 | 123.46 |
| −6.703256 | 2 | −6.70 |
| 123.456784 | 5 | 123.45678 |
| −6.703256 | 5 | −6.70326 |
| 123.456784 | 0 | 123. |
| −6.703256 | 0 | −7. |

If the FIX () key is depressed but not followed by a decimal digit key, the calculator will automatically treat the next key depressed as being the 0 key (i.e. n will thereupon equal 0 as in the last example).

Numbers of up to (and including) ten significant digits and their signs (if negative) may be displayed in the fixed decimal point format. Thus, (10-n) digits may be displayed to the left of the decimal point. If a number to be displayed has more than (10-n) digits to the left of the decimal point (i.e. is too large for the selected value of n), the display of that number (not the whole display) overflows and thereupon reverts to the floating decimal point format. This is illustrated by the fixed decimal point display of FIG. 1 wherein the numbers contained in the x and y registers have overflowed and are therefore displayed in the floating decimal point format. It is also illustrated by the following example:

| NUMBER TO BE DISPLAYED | VALUE OF n | ACTUAL NUMBER DISPLAYED | |
|---|---|---|---|
| 1234567.89 | 5 | 1.23456789 | 06 |

If the first non-zero digit of a number to be displayed is more than n digits to the right of the decimal point (i.e. is too small for the selected value of n), the display of that number (not the whole display) underflows. In this case only zeros will be displayed. This is illustrated by the following example:

| NUMBER TO BE DISPLAYED | VALUE OF n | ACTUAL NUMBER DISPLAYED |
|---|---|---|
| 0.0000012 | 3 | 0.000 |

Regardless of the way in which numbers are displayed, the calculator always stores all numbers and performs all calculations in the floating decimal point format. Furthermore, regardless of the number of digits entered or displayed, each number is stored with twelve significant digits, their associated sign, a two-digit exponent, and its associated sign. Up to (and including) ten significant digits, their associated sign, the two-digit exponent, and its associated sign can be displayed (however, no sign is displayed for positive numbers or exponents). The remaining two digits (called guard digits) are not displayed. They are employed to maintain greater than ten-place accuracy during calculations and also to automatically round the tenth displayed digit.

The calculator has a dynamic range of from $\pm 10^{-98}$ to $\pm 9.999999999(99) \times 10^{98}$. Whenever this range is exceeded during a calculation the STATUS indicator light 19 turns on.

Numeric Data Entry Keys (0-9), ., ENTER EXP, CHG SIGN, $\pi$)

The decimal digit keys 0-9 are depressed to enter numbers into the x-register. Numbers are entered serially, the last digit entered becoming the least significant digit. For example, the number 1325 is entered by sequentially depressing the decimal digit keys 1, 3, 2, and 5. A number entered into the x-register is terminated as soon as any non-data-entry key is depressed. Another number entered into the x-register will automatically replace a terminated number, but will become a part of any non-terminated number.

The decimal point (.) key is depressed to enter the decimal point into the x-register. For example, the number 1.234 is entered by sequentially depressing the 1, ., 2, 3, and 4 keys. Regardless of the display format, it is not necessary to use the decimal point key when entering integers. If the decimal point key is not used, the decimal point will be assumed to have followed the last-entered digit. When the fixed decimal point display format is used, the calculator automatically positions the decimal point. Similarly, when the floating decimal point display format is used the calculator automatically corrects the exponent according to the position of the decimal point.

The ENTER EXP key is depressed followed by one or two decimal digit keys to enter a one- or two-digit exponent (power of ten) into the x-register, the last digit entered becoming the least significant digit. If a third digit is entered, it will terminate entry of the exponent and begin a new numeric data entry. A non-terminated number in the x-register may be multiplied directly by successive powers of ten by simply entering successive exponents. For example, the product of $8.3 \times 10^2 \times 10^{14}$ may be obtained by sequentially depressing the 8, ., 3, ENTER EXP, 2, ENTER EXP, 1, and 4 keys. If the ENTER EXP key is depressed as the first key of a numeric data entry (i.e. before any of the decimal digit keys have been depressed or following a terminated number), the number 1 is entered into the x-register. For example, the number $1 \times 10^{16}$ may be entered by depressing the ENTER EXP, 1, and 6 keys.

The CHG SIGN key is depressed to change the sign of any terminated or unterminated number in the x-register. If the CHG SIGN key is depresed as the first key of a numeric data entry, it changes the sign of the number then in the x-register (whatever the sign may be) and, once that number is replaced by the first digit of the new data entry, it prefaces the new data entry with a negative sign. This is illustrated by the following example:

| KEYS DEPRESSED | CONTENTS OF x-REGISTER |
|---|---|
|  | −123.45 |
| CHG SIGN | 123.45 |
| 6 | −6. |
| 7 | −67. |

The CHG SIGN key is also depressed immediately following the ENTER EXP key (or the last-entered digit of the exponent) to enter negative exponents into the x-register. For example, the number $8.3 \times 10^{-2} \times 10^4 \times 10^{-12}$ may be entered by sequentially depressing the keys 8, ., 3, ENTER EXP, CHG SIGN, 2, ENTER EXP, 4, ENTER EXP, CHG SIGN, 1, and 2 keys and the number $1 \times 10^{-16}$ may be entered by depressing the ENTER EXP, 1, 6, and CHG SIGN keys.

The $\pi$ key is depressed to enter the value of $\pi$ (i.e. 3,14159265360) into the x-register.

Clear keys (CLEAR x, CLEAR)

The CLEAR x key clears (i.e. sets to zero) the x-register. It does not affect any other registers.

The CLEAR key clears the x-, y-, and z- (working) registers, clears the a- and b- (data storage) registers, and clears (or resets) the flag, which can be set by the SET FLAG key as hereinafter explained. It does not affect any other registers.

When calculator is switched on, all of the working, program, and data storage registers of the RWM are automatically cleared. Any terminated numbers subsequently stored in them will automatically be cleared and replaced by any new data entry.

Working Register Control Keys ( ↑ , ↓ , ROLL ↑ , x ⟳ y)

The working register control keys are used to reposition the contents of the x-, y-, and z-registers. They do not affect any other registers.

When the ↑ key is depressed, the contents of the y-register shift to the z-register and the contents of the x-register appear in both the x- and y-registers. The contents of the z-register are lost.

When the ↓ key is depressed, the contents of the y-register shift to the x-register and the contents of the z-register appear in both the y- and z-registers. The contents of the x-register are lost.

When the ROLL ↑ key is depressed, the contents of the x-register shift to the y-register, the contents of the y-register shift to the z-register, and the contents of the z-register shift to the x-register. No information is lost.

The x ⟳ y key is depressed to exchange the contents of the x- and y-registers. The contents of the z-register are unaffected by this operation.

Arithmetic Keys (+, −, x, ÷)

These four keys are used to perform working register arithmetic operations in which the contents of the x- and y-registers are employed as operands. The results of these arithmetic operations are stored in the y-register and the contents of the x-register remain unchanged by the arithmetic operations performed. These four keys do not affect any other registers.

The + key is depressed to add the number in the x-register to the number in the y-register, the sum appearing in the y-register.

The − key is depressed to subtract the number in the x-register from the number in the y-register, the difference appearing in the y-register.

The x key is depressed to multiply the number in the y-register by the number in the x-register, the product appearing in the y-register.

The ÷ key is depressed to divide the number in the y-register by the number in the x-register, the quotient appearing in the y-register.

The use of these keys and the working register control keys is illustrated by the following method of computing $$\frac{(3 \times 4) + (8 - 9)}{(8 \times 2) - 6} = 1.1:$$

| KEYS DE-PRESSED | CONTENTS OF x-REGISTER | CONTENTS OF y-REGISTER | CONTENTS OF z-REGISTER |
|---|---|---|---|
| CLEAR | 0 | 0 | 0 |
| 3 | 3 | 0 | 0 |
| ↑ | 3 | 3 | 0 |
| 4 | 4 | 3 | 0 |
| × | 4 | 12 | 0 |
| ROLL ↑ | 0 | 4 | 12 |
| 8 | 8 | 4 | 12 |
| x⇄y | 4 | 8 | 12 |
| 9 | 9 | 8 | 12 |
| − | 9 | −1 | 12 |
| ↓ | −1 | 12 | 12 |
| + | −1 | 11 | 12 |
| ROLL ↑ | 12 | −1 | 11 |
| 8 | 8 | −1 | 11 |
| x⇄y | −1 | 8 | 11 |
| 2 | 2 | 8 | 11 |
| × | 2 | 16 | 11 |
| 6 | 6 | 16 | 11 |
| − | 6 | 10 | 11 |
| ↓ | 10 | 11 | 11 |
| ÷ | 10 | 1.1 | 11 |

The answer, appearing in the y-register, is underlined.

Unary Function Keys ($\sqrt{x}$, $x^2$, $1/x$, int x, CHG SIGN)

These five keys are used to perform unary functions in which the contents of the x-register are employed as the argument. The results of the unary functions performed are placed in the x-register. These five keys do not affect any other registers.

The $\sqrt{x}$ key is depressed to calculate the square root of the number in the x-register. If the number is negative, the square root of its absolute value is calculated and the STATUS indicator light 19 turned on. The STATUS indicator light remains on until the next key is depressed.

The $x^2$ key is depressed to calculate the square of the number in the x-register. If the number is greater than $\sqrt{10}\times 10^{49}$, the number $9.99999999999\times 10^{98}$ is placed in the x-register and the STATUS indicator light 19 turned on. The STATUS indicator light remains on until the next key is depressed.

The 1/x key is depressed to calculate the reciprocal of the number in the x-register. For example, 1/9.8 may be calculated by sequentially depressing the 9, ., 8, and 1/x keys.

The int x key is depressed to truncate the fractional part of the number in the x-register. It does not affect the sign of the integer part of the number. For example, if the number −5.9 is contained in the x-register when the int x key is depressed, the number −5.0 will remain.

The CHG SIGN key has already been described above in connection with the numeric data entry keys.

Data-Storage and Register-Transfer Keys (a, b, x→( ), y→( ), x←( ), y⊃( ), INDIRECT)

These keys are variously used to perform direct data storage and recall, direct storage-register arithmetic, indirect data storage and recall, and indirect storage-register arithmetic operations. As illustrated below, the a and b keys are depressed following any of the remaining five keys of this group to specify the a- and b-registers, respectively. The a and b keys may also be used to directly recall the contents of the a- and b-registers, respectively, to the x-register without changing the contents of the a- and b-registers themselves. Either of these functions of the a and b keys may be performed in response to a single keystroke thereof. For example, the contents of the b-register may be directly recalled to the x-register by simply depressing the b key alone. As noted above the contents of the b-register itself will remain unchanged by this recall operation.

The x→( ), y→( ), x←( ), and y⊃( ) keys are used to control the transfer of numeric data from the x- and y-registers to the a- and b-registers and 49 additional storage registers available to the user (at user addresses 000-048) in the data storage section of the RWM and from these storage registers to the x- and y-registers. If the 60 optional storage registers included in the data storage section of the RWM (at user addresses 049-108) are made available to the user, these same four keys may also be used to control the transfer of numeric data from the x- and y-registers to these optional storage registers and from them to the x- and y-registers.

The specific storage register to or from which numeric data is transferred by these four keys is specified by the key or keys depressed immediately following them. Accordingly, the a key is used to specify the a-register, the b key to specify the b-register, and the decimal digit keys 0-9 to selectively specify any of the available storage registers at user addresses 000-108 of the data storage section of the RWM. For simplicity of description, the available storage registers at user addresses 000-108 will hereinafter be referred to by their addresses (i.e. the storage register at any available address nnn will be referred to as register nnn). If a nonexistant or nonavailable storage register is designated, the STATUS indicator light is turned on, no data transfer or arithmetic operation is performed, and the operation of the calculator halts. (If such a register is designated while the calculator is automatically executing a stored program, the program-counter specifies the program step immediately following the improper operation.)

The x→( ) key is depressed followed by the a key, the b key, or decimal digit keys n, n, n to directly store the contents of the x-register in the a-register, the b-register, or register nnn respectively. In any case, the contents of the x-register remain unchanged by this operation. For example, π may be stored directly in the b register by sequentially depressing the π, x→( ), and b keys. Similarly, π may be stored directly in register 027, by sequentially depressing the π, x→( ), 0, 2, and 7 keys. In each of these examples, π will also remain in the x-register.

The y→( ) key is depressed followed by the a key, the b key, or decimal digit keys n, n, n to directly store the contents of the y-register in the a-register, the b-register, or register nnn, respectively. In any case, the contents of the y-register remain unchanged by this operation. For example, a number contained in the y-register may be stored directly in register 000, without changing the contents of the y-register, by sequentially depressing the y→( ), 0, 0, and 0 keys.

The x→( ) key is depressed followed by the a key, the b key, or decimal digit keys n, n, n, to directly recall the contents of the a-register, the b-register, or register nnn, respectively, to the x-register. In any case, the contents of the recalled register remain unchanged by this operation. For example, the contents of register 012 may be recalled to the x-register, without changing the contents of register 012, by sequentially depressing the x→( ), 0, 1, and 2 keys. Recall from the a- or b-register to the x-register may be accomplished in the same manner as described above, by simply depressing the a or b key alone.

The y⇄( ) key is depressed followed by the a key, the b key, or decimal digit keys n, n, n, to exchange the contents of the y-register with the contents of the a-register, the b-register, or register nnn, respectively. For example, a number in the y-register may be exchanged with a number in register 048 by depressing the y⇄( ), 0, 4, and 8 keys.

The direct storage and recall operations performed by the x→( ), y→( ), x←( ), and y⇄( ) keys may be conveniently summarized by employing the following notation:

$$\left\{\begin{matrix} x\rightarrow() \\ y\rightarrow() \\ x\leftarrow() \\ y\rightleftarrows() \end{matrix}\right\} \left\{\begin{matrix} a \\ b \\ nnn \end{matrix}\right\}$$

In this notation each pair of braces implies that any one of the enclosed group of key operations or storage registers may be selected. The order of the successive pairs of braces from left to right specifies the key-sequence required to perform the selected key operation with the selected storage register. Thus, any of the key operations enclosed in the left-hand pair of braces may be employed with any of the storage registers enclosed in the right-hand pair of braces by first depressing the key performing the selected key operation and then depressing the key or keys designating the selected storage register. The usefullness of these direct storage and recall operations is illustrated by the following method of multiplying a series of numbers $n_1$, $n_2$, etc. by a constant K, where $n_1=3, n_2=11.2$, etc. and $K=1.684$:

| KEYS DE-PRESSED | CONTENTS OF x-REGISTER | CONTENTS OF y-REGISTER | CONTENTS OF a-REGISTER |
|---|---|---|---|
| CLEAR | 0 | 0 | 0 |
| 1, 0, 6, 8, 4, | 1.684 | 0 | 0 |
| y⇄( ), a | 1.684 | 0 | 1.684 |
| 3 | 3 | 0 | 1,684 |
| ↑ | 3 | 3 | 1,684 |
| a | 1.684 | 3 | 1.684 |
| × | 1.684 | <u>5.0520</u> | 1.684 |
| 1, 1, ., 2 | 11.2 | 5.0520 | 1.684 |
| ↑ | 11.2 | 11.2 | 1.684 |
| a | 1.684 | 11.2 | 1.684 |
| × | 1.684 | <u>18.8608</u> | 1.684 |

The answers, appearing in the y-register, are underlined.

The x→( ), y→( ), x←( ), and y⇄( ) keys may also be employed with the $+, -, \times,$ and $\div$ arithmetic keys to perform direct register-arithmetic operations in which the contents of the x-register or the y-register are employed as one operand and the contents of the a-register, the b-register, or register nnn are employed as the other operand. These direct register-arithmetic operations may be summarized as follows by using the above-described notation:

$$\left\{\begin{matrix} x\rightarrow() \\ y\rightarrow() \\ x\leftarrow() \\ y\rightleftarrows() \end{matrix}\right\} \left\{\begin{matrix} + \\ - \\ \times \\ \div \end{matrix}\right\} \left\{\begin{matrix} a \\ b \\ nnn \end{matrix}\right\}$$

Thus, the x→( ) key may be employed to directly perform any of the arithmetic operations enclosed by the second pair of braces upon the contents of the x-register and the contents of any of the storage registers enclosed by the third pair of braces and store the result in the selected storage register without recalling the contents of the selected storage register and without changing the contents of the x-register. For example, the contents of the x-register may be subtracted from the contents of the b-register by sequentially depressing the x→( ), −, and b keys. The difference is stored in the b-register, and the contents of the x-register remain unchanged by the operation. Similarly, the contents of register 042 may be divided by the contents of the x-register by sequentially depressing the x→( ), ÷,0,4, and 2 keys. The quotient is stored in register 042, and the contents of the x-register itself remain unchanged by the operation.

The y→( ) key may be similarly employed to directly perform any of the arithmetic operations enclosed by the second pair of braces upon the contents of the y-register and any of the storage registers enclosed by the third pair of braces and store the result in the selected storage register without recalling the contents of the selected storage register and without changing the contents of the y-register. For example, the contents of the y-register may be added to the contents of the a-register by sequentially depressing the y→( ), +, and a keys. The sum is stored in the a-register, and the contents of the y-register remain unchanged by the operation. Similarly, the contents of register 038 may be mulitplied by the contents of the y-register by sequentially depressing the y→( ), ×, 0, 3, and 8 keys. The product is stored in register 038, and the contents of the y-register remain unchanged by the operation.

The x←( ) key may be employed to directly perform any of the arithmetic operations enclosed by the second pair of braces upon the contents of the x-register and the contents of any of the storage registers enclosed by the third pair of braces and store the result in the x-register without changing the contents of the selected storage register. For example, the contents of the a-register may be added to the contents of the x-register by sequentially depressing the x←( ), +, and a keys. The sum is stored in the x-register, and the contents of the a-register remain unchanged by the operation. Similarly, the contents of the x-register may be multiplied by the contents of register 022 by sequentially depressing the x←( ), ×,0,2, and 2 keys. The product is stored in the x-register, and the contents of register 022 remain unchanged by the operation.

The y⇄( ) key may be employed to directly perform any of the arithmetic operations enclosed by the second pair of braces upon the contents of the y-register and the contents of any of the storage registers enclosed by the third pair of braces and store the result in the y-register without changing the contents of the selected storage register (i.e. the y⇄( ) may be used as though it were a y←( ) key in performing register-arithmetic operations).

For example, the contents of the b-register may be subtracted from the contents of the y-register by sequentially depressing the y⇄( ), −, and b keys. The difference is stored in the y-register, and the contents of the b-register remain unchanged by the operation. Similarly, the contents of the y-register may be divided by the contents of regiters 039, by sequentially depressing the y⇄( ), ÷,0,3, and 3 keys. The quotient is stored in the y-register, and the contents of register 039 remains unchanged by the operation.

The INDIRECT key is used with the above-described data-storage and register-transfer keys to perform indirect data-storage and recall and indirect register-arithmetic operations, in which the contents of a directly-addressed register (e.g. the a-register, the b-register or any of the registers nnn) are employed as the address of an indirectly-addressed storage register (e.g. any of the other storage registers nnn) to be used in these operations. When indirectly addressing any of the storage registers 000 through 048 or 108, care must be taken to insure that the directly-addressed register contains the proper address nnn of the indirectly addressed-register nnn. The indirect address used is the absolute value of the integer part of the contents of the directly addressed register. Thus, 1.732 will be treated as the address of register 001, −6.99 as the address of register 006, 0.999 as the address of register 000, and 106.75 as the address of register 106. Since the storage registers may only contain numeric data, the a- and b-registers may not be used as the indirectly-addressed registers in these operations.

The indirect data storage and recall operations may be summarized as follows by again using the above-described notation without braces for the INDIRECT key:

$$\left\{\begin{array}{c} x\rightarrow(\,) \\ y\rightarrow(\,) \\ x\leftarrow(\,) \\ y\supset(\,) \end{array}\right\} \text{INDIRECT} \left(\begin{array}{c} a \\ b \\ nnn \end{array}\right)$$

Thus, the x→( ) and y→( ) keys may be employed with the INDIRECT key to indirectly store the contents of the x- and y-registers, respectively in any storage register nnn designated by the contents of any of the other data storage registers. Moreover, this may be accomplished without changing the contents of the x- and y-registers or of the directly addressed storage register. For example, the contents of the x-register may be indirectly stored in the storage register designated by the contents of the a-register by sequentially depressing the x→( ), INDIRECT, and a keys. The contents of the x-register and the a-register remain unchanged by this operation. Similarly, the contents of the y-register may be indirectly stored in the storage register designated by the contents of register 022 by sequentially depressing y→( ), INDIRECT, 0, 2, and 2 keys. The contents of the y-register and register 022 remain unchanged by this operation.

The x←( ) key may be similarly employed with the INDIRECT key to indirectly recall to the x-register the contents of any storage register nnn designated by the contents of any of the other storage registers. This is accomplished without changing the contents of either the directly- or indirectly-addressed storage register. For example, the contents of the register nnn designated by the contents of the b-register may be indirectly recalled to the x-register by sequentially depressing the x←( ), INDIRECT, and b keys. The contents of the b-register and of the indirectly-addressed register remain unchanged by this operation.

The y ( ) key may be employed with the INDIRECT key to indirectly exchange the contents of the y-register with the contents of any storage register nnn designated by the contents of any of the other storage registers. This is accomplished without changing the contents of the directly-addressed storage register. For example, the contents of the y-register may be indirectly exchanged with the contents of the register designated by register 041 by sequentially depressing the y⊃( ), INDIRECT, 0, 4, and 1 keys. The contents of register 041 remain unchanged by this operation.

The indirect register-arithmetic operations may be summarized as follows:

$$\left\{\begin{array}{c} x\rightarrow(\,) \\ y\rightarrow(\,) \\ x\leftarrow(\,) \\ y\supset(\,) \end{array}\right\} \text{INDIRECT} \left\{\begin{array}{c} + \\ - \\ \times \\ \div \end{array}\right\} \left(\begin{array}{c} a \\ b \\ nnn \end{array}\right)$$

In connection with the indirect register arithmetic operations it should be noted that the INDIRECT key may also be depressed immmediately after the selected arithmetic key. Thus, the indirect register-arithmetic operations may also be summarized as follows:

$$\left\{\begin{array}{c} x\rightarrow(\,) \\ y\rightarrow(\,) \\ x\leftarrow(\,) \\ y\supset(\,) \end{array}\right\} \left\{\begin{array}{c} + \\ - \\ \times \\ \div \end{array}\right\} \text{INDIRECT} \left(\begin{array}{c} a \\ b \\ nnn \end{array}\right)$$

Thus, any of the x→( ), y→( ), x←( ), and y⊃( ) keys may be employed with the INDIRECT key and any of the arithmetic keys to indirectly perform register-arithmetic operations employing the contents of either the x- or the y-register as one operand and the contents of any of the storage registers nnn designated by the contents of any of the other storage registers as the other operand. In the case of the x→( ) and y→( ) keys, the results of these operations are stored in the indirectly addressed storage register nnn, and the contents of the x- and y-registers and the directly-addressed registers are not changed. Similarly, in the case of the x←( ) and y⊃( ) keys, the results of these operations are stored in the x- and y-registers, respectively, and the contents of the directly and indirectly addressed registers are not changed.

For example, the contents of the x-register may be added to the contents of the register nnn designated by the contents of the a-register by sequentially depressing the x→( ), INDIRECT, +, and a keys. The sum is stored in the indirectly-addressed register nnn, and the contents of the x-register and the a-register remain unchanged by this operation. Similarly, the contents of the storage register nnn designated by the contents of register 014 may be multiplied by the contents of the y-register by sequentially depressing the y→( ), ×, INDIRECT, 0, 1, and 4 keys. The product is stored in the indirectly-addressed storage register nnn, and the contents of the y-register and register 014 remain unchanged by the operation. Similarly, the contents of the register nnn designated by the contents of the b-register may be subtracted from the contents of the x-register by sequentially depressing the x←( ), INDIRECT, −, and b keys. The difference is stored in the x-register, and the contents of the b-register and the indirectly-addressed register remain unchanged by the operation. As a last example, the contents of the y-register may be divided by the contents of the register nnn designated by the contents of register 008 by sequentially depressing the y⊃( ), INDIRECT, ÷, 0, 0, and 8 keys. The quotient is stored in the y-register, and the contents of register 008 and the indirectly-addressed register nnn remain unchanged by this operation.

Multiple-level indirect addressing may be performed to any desired level in the above described indirect data storage and recall and indirect register arithmetic operations by sequentially depressing the INDIRECT key once for each desired level. Multiple-level indirect data storage and recall may be summarized as follows:

Thus, for example, the contents of the x-register may be indirectly stored in the contents of register 017 designated by the contents of register 003 in turn designated by the contents of the a-register by sequentially depressing the x→( ), INDIRECT, INDIRECT, and a keys. The contents of the x-register, the a-register, and register 003 remain unchanged by this operation. Similarly, the contents of register 046 designated by the contents of register 031 in turn designated by the contents of register 000 in turn designated by the contents of register 025 may be exchanged with the contents of the y-register by sequentially depressing the y⇄( ), INDIRECT, INDIRECT, INDIRECT, 0, 2, and 5 keys. The contents of registers 025, 000 and 031, remain unchanged by this operation.

Multiple level indirect register-arithmetic may be similarly summarized as follows:

OR

Thus, assuming, for example, that the 60 optional storage registers 049-108 are available to the user, the contents of the y-register may be subtracted from the contents of register 108 designated by the contents of register 082, in turn designated by the contents of register 049 by sequentially depressing the y→( ), INDIRECT, INDIRECT, −, 0, 4, and 9 keys. The difference is stored in register 108 and the contents of the y-register, register 049, and register 082 remain unchanged by this operation. Similarly, the contents of the x-register may be divided by the contents of register 106 designated by the contents of register 056 in turn designated by the contents of the b-register by sequentially depressing the x←( ), ÷, INDIRECT, INDIRECT, INDIRECT, and b keys. The results are stored in the x-register, and the contents of the b-register and registers 003, 056, and 106 remain unchanged by this operation.

Numeric Address Termination

As described above, each of the available numerically-addressed storage registers 000 through 048 or 108 employed in the foregoing data-storage and register-transfer operations is properly addressed by selectively depressing the decimal digit keys to specify its three-digit address. Upon entry of the third digit, the numeric address is automatically terminated. Any immediately following digit entries are therefore not intrepreted as part of the numeric address, but rather as the beginning of a new data entry. Thus, for example, if the x→( ), 1, 0, 3, 2, and 5 keys are sequentially depressed, the contents of the x-register are stored in register 103, and the number 25 is entered into the x-register. Similarly, if the y→( ), +, 0, 0, 2, 1, and + keys are sequentially depressed, the contents of the y-register are added to the contents of register 002, and the number 1 is entered into the x-register and thereupon added to the contents of the y-register.

A numeric address may also be terminated, without entering leading zeros of the address, by depressing any non-numeric key except the STEP PRGM key or, if the calculator is in the manual operating or first key-log printing mode, the CONTINUE key. However, most of the terminating key entries that may be used will also be executed. For example, if the x→( ), 2, and + keys are sequentially depressed, the contents of the x-register are stored in storage register 002 and also added to the contents of the y-register. Similarly, if the y→( ), +, 3, 8, and a keys are sequentially depressed, the contents of the y-register are added to the contents of register 038, and the contents of the a-register are recalled to the x-register.

When the calculator is in the manual operating or first key-log printing mode, the STOP key may be used to terminate a numeric address if a no-operation address-terminating key entry is desired. For example, by simply depressing the x→( ), 3, and STOP keys the contents of the x-register may be stored in register 003 without performing any other operation. Similarly, when formulating or entering a program by which the calculator is to be controlled in the automatic operating mode, a CONTINUE program step may be employed to terminate a numeric address if a no-operation address-terminating program step is desired. For example, if the program steps y→( ), ×, 2, 9, CONTINUE, and 3 are sequentially encountered when the calculator is in the automatic operating mode, the contents of register 29 are multiplied by the contents of the y-register, and the product is stored in register 29. No operation is performed by the CONTINUE program step, and the next program step 3 is stored in the x-register as the beginning of a new data entry.

Since every numeric storage register except optional registers 100-108 may be uniquely specified by less than three digits, these abbreviated address-termination features permit significant reductions in the number of key-operations and program steps required to perform many calculations. Moreover, these same address termination features may be used in connection with the four-digit numeric addresses of the program storage section of the RWM to achieve still further reductions in the number of key-operations and program-steps required to perform many calculations.

Program-Control Keys (GO TO, IF x<y, IF x=y, IF x>y, IF FLAG, SET FLAG, LABEL, SUB/RETURN)

All of the previously-described keys except the FLOAT, FIX( ), RUN, PRGM, KEY LOG, LIST, LOAD, and RECORD keys may be employed both for controlling the operation of the calculator during the manual operating and first key-log printing modes and for entering program steps into the calculator during the program entering and second key-log printing modes. When the calculator is in the manual operating mode, the user may continuously observe the output display of the contents of the x-, y-, and z-registers and, in accordance with his observations, make his own decisions about what to do next an any stage of the calculation. However, this is not possible when the calculator is executing a stored program at high speed in the automatic operating mode. The above eight program-control keys have therefore been provided to permit the calculator itself to test calculated quantities and make decisions based on those tests during the automatic execution of an internally-stored program. These eight keys may be used to permit unconditional branching (or transfers), conditional branching (or transfers), symbolic or labelled branching, storage of "yes-no" information in a flag and conditional branching based on that "yes-no" information at a later stage in the execution of a program, and unconditional or conditional branches to pre-defined program routines with return to the main program sequence upon completion.

Branching instructions in a program cause the user program counter to specify an address other than the next sequential address in the program storage section of the RWM, whereupon execution of the program continues sequentially from the new address. If a branch is conditional, the calculator makes a decision, based upon a specified condition, whether or not to branch. However, if the branch is unconditional, the calculator has no option, and must branch to the address specified in the program (e.g. by a GO TO program step followed by a numeric address nnnn).

The GO TO key is depressed followed by decimal digit keys specifying a selected four-digit address nnnn in the program storage section of the RWM to set the user program counter to the selected address nnnn. When this sequence of keycodes is encountered as a sequence of program steps, an unconditional branch is made to the address indicated and the program step stored at that address is executed. Execution of the program then automatically continues to run from that address.

For simplicity of description the terms "keys" and "programs steps" will hereinafter be used synonomously since the remaining keys of this group are used almost exclusively to enter keycodes into the calculator as program steps during the program entering mode of the calculator. All of the program steps so entered are automatically executed during the automatic operating mode of the calculator.

The four IF keys are used for conditional branching. The IF x<y, IF x=y, and IF x>y keys compare the numeric values contained in the x- and y-registers to determine if the number in x is less than the number in y, equal to the number in y, or greater than the number in y respectively. The IF FLAG key tests the condition ("yes-no") of the flag, which is controlled by the SET FLAG key hereinafter explained. There can be only two possible results to each test made by each of these four keys. The condition tested is either "met" (YES) or "not met" (NO).

When the condition tested is met (YES), the next program step following the "IF" is automatically executed. However, when the condition tested is not met (NO), the calculator automatically skips (ignores) the next four program steps and continues execution at the fifth program step following the "IF".

If the program steps immediately following the "IF" constitute a numeric address nnnn and the condition tested is met (YES), an automatic branch is made to that address nnnn. The program step stored at address nnnn is thereupon executed, and automatic execution of the program continued from there. If the program steps immediately following the "IF" constitute operations (e.g. +, ↑, etc.) then no branch occurs and the operations are executed.

When an IF program step (other than IF FLAG) is encountered, the two numbers in the x- and y-registers are automatically rounded before the test is made. In each register, the tenth digit of the number is rounded according to the value of the guard digits; the guard digits are then set equal to zero. Thus the numbers to be tested actually have the same values as would appear in a floating point display with all ten significant digits displayed. After the test has been made, the numbers in the x- and y-registers retain their rounded values. This means that the actual values of the number in the x- and y-registers may be different after the test than before. If the resulting slight loss in accuracy is undesireable, the numbers in the x- and y-registers can be stored in the data-storage section of the RWM before the "IF" test is made and can be recalled and substituted for the rounded numbers after the "IF" test is completed.

The use of the IF x>y and IF x<y keys is illustrated by employing the following sequence of program steps beginning with an IF x>y program step and including a three-step conditional routine for taking the absolute value of the contents of the y-register:

If the contents of the x-register are greater in value than the contents of the y-register (i.e. condition met), then every program step in this sequence is executed and the absolute value of the contents of the y-register is calculated. As described above CONTINUE is a no-operation program step. It is used in this and the following examples to fill in the fourth program step to be skipped if the test condition is not met. If the contents of the x-register are equal to or greater in value than the contents of the y-register (i.e. the condition is not met), then the four program steps immediately following the IF x>y program step are skipped and execution continues beginning with the ↑ program step. In this case the absolute value of the contents of the y-register is not calculated.

The use of the IF x=y key is illustrated by employing the following sequence of program steps:

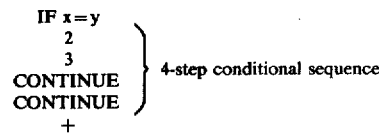

If the contents of the x-register equal the contents of the y-register in value (i.e. condition met), then every program step in this sequence is executed. This results in an automatic branch to execute the program step stored at user address 0023. However, if the contents of the x-register do not equal the contents of the y-register in value (i.e. condition not met), the four program steps immediately following the IF x=y program step are skipped and execution continues beginning with the + program step.

The use of the IF FLAG key is illustrated by the following sequence of program steps:

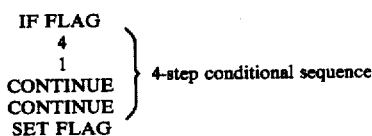

If the flag controlled by the SET FLAG key has been set (i.e. condition met), then every program step in this sequence is executed. This results in an automatic branch to execute the program step stored at user address 0041. However, if the flag controlled by the SET FLAG key has not been set (i.e. condition not met), then the four program steps immediately following the IF FLAG program step are skipped and execution continues beginning at the SET FLAG program step by setting the flag.

The SET FLAG key establishes the condition to be tested by the IF FLAG key. The "YES" condition is established when a SET FLAG keycode is encountered either as a program step or as a keyboard entry. The "NO" condition is established by clearing the flag. This occurs automatically whenever the calculator is switched on or whenever a CLEAR or IF FLAG key code is encountered either as a program step or as a keyboard entry. If the flag condition must be retained for use later, the program must include a SET FLAG program step in the sequence of program steps executed following the flag-clearing program step. The flag enables the user to select the conditions which will determine whether a conditional branch (or operation) is to be made.

The LABEL key allows relocatable symbolic addresses to be used within a program. A LABEL key immediately followed by any other programmable key (e.g. LABEL, $\pi$) except the END key serves as a symbolic address that may be inserted in a program immediately before any program step a user may wish to relocate independently of its absolute (numeric) address. This symbolic address is relocated by a search command comprising a GO TO key immediately followed by the symbolic address itself (e.g. GO TO, LABEL, $\pi$). In response to this search command, the user program counter is reset to the first user available address 0000 in the program storage section of the RWM and is sequentially incremented in a search operation until the symbolic address (e.g. LABEL, $\pi$) is found. The user program counter then specifies the next address which is the program step designated by the symbolic address.

If the search command came from the keyboard, the calculator waits for the next key to be depressed. However, if the search command came from the program, then execution automatically continues at the program step designated by the symbolic address. The keys of the symbolic address itself serve as no-operation codes and are ignored during execution of the program. This may be illustrated by the following sequence of program steps.

| ADDRESS | PROGRAM STEP |
|---|---|
| 0098 | --- |
| 0099 | GO TO |
| 0100 | LABEL |
| 0101 | ÷ |
| 0102 | etc. |
| . | . |
| . | . |
| . | . |
| 0362 | --- |
| 0363 | LABEL |
| 0364 | ÷ |
| 0365 | ↑ |
| 0366 | etc. |

The search for the symbolic address "LABEL, ÷" is initiated immediately after address 0101 is designated by the user program counter and starts at address 0000. When the symbolic address is found, program execution continues with the ↑ program step at address 0365. The ÷ program, steps 0101 and 0364, serving as part of the symbolic address are not executed.

A specific symbolic address cannot be used to specify more than one location at any one time. If it is, only the first (lowest order numeric address) specified will be valid (i.e. the point of transfer). Any number of different labels can be used at one time, limited to the number of keys available to follow the LABEL key.

If transfer to an undefined symbolic address occurs, the calculator will search all of program memory, and if the symbolic address is not found, will stop with the STATUS indicator light on. The program-counter will specify the next following program steps.

Branching to a symbolic address offers considerable advantages over branching to an absolute address. Programs with symbolic addresses can be stored anywhere in the program storage section of the RWM and can be easily moved and relocated because there are no absolute addresses to be changed. Also, any time a program is to be corrected (i.e. program steps changed, added or deleted), any absolute addresses must be checked in case they themselves, must now be changed as a result of the corrections. This may entail substantial bookkeeping by the user. If symbolic addresses are used instead of absolute addresses, the corrections will not affect the symbolic addresses.

The main disadvantage of using symbolic addresses is that a search takes considerably more time (depending upon the location of the label in memory) than does a branch to an absolute address. Usually, this will have no significance because, in this case, "time" constitutes only a few thousandths of a second. Even if time is a significant factor, the user may still take advantage of symbolic addresses by writing his original program with symbolic addresses and once the program has been completely debugged, changing the symbolic addresses to the appropriate absolute addresses.

The SUB/RETURN key is used to transfer to (i.e. call) a subroutine (subprogram) and return from the subroutine to the point in the calling program where the transfer was initiated. Subroutines may be nested up to a depth of five. An attempt to nest to a depth of more than five is an error, stopping execution of the program and turning on the STATUS indicator light. Both the automatic initialization occuring at turn-on and the END key (given either as a program step or a keyboard entry) automatically reset the nesting to a depth of zero so that all five depths are then available. A GO TO key followed by a SUB/RETURN key and either an absolute numeric or symbolic labelled address may be used in the calling program to (unconditionally) call a subroutine. The address used specifies the starting address of the subroutine. If a symbolic address is used, the first two program steps of the subroutine must also be the same symbolic address. An IF key followed by GO TO and SUB/RETURN keys and either an absolute numeric or symbolic labelled starting address may also be used in the calling program to conditionally call a subroutine. Execution of the steps of the subroutine starts automatically as soon as the subroutine is called. A SUB/RETURN key must be included as the last step to be executed in the subroutine. The RETURN causes a branch to the "return-address" in the calling program. The return address is always the address immediately following the last step used to call the subroutine. Execution of the calling program then continues automatically, starting at the return address.

Any number of subroutines may be called individually during a program. However, it is also possible to use more than one subroutine at one time. One subroutine can call a second subroutine which, in turn, can call a third subroutine, and so on. This multiple-calling is known as "nesting". The calculator can remember (store) from one to five return-addresses at a time so that the subroutines may be nested up to a depth of five. Returns are made on a "last-in, first-out" basis, the return always being made to the last return-address stored. As soon as the return is made, that return-address is forgotten (erased from storage) so that the previous address now becomes the "last" one. Thus the returning order is always the opposite of the calling order.

A program written as a subroutine may also be used as a "stand-alone" program. This is accomplished by depressing the END key to erase any return-addresses currently stored in the calculator and by not using the SUB/RETURN key when addressing the memory before the program is run.

Special Function Keys (FMT, PRINT/SPACE, PAPER)

The FMT (format) key is used to initiate special operations not otherwise defined and implemented by the other basic keys of the calculator. It is always used with other keys and, in effect, serves to re-define these other keys to implement the desired special operations. Several of these special operations associated with the FMT key are defined as part of the basic calculator. Others have been defined as part of associated plug-in ROM modules and are available only when the associated ROM modules are plugged into the calculator.

The command-sequences FMT, ↑ and FMT, ↓ are used to operate the X-Y plotter peripheral unit. They are part of the basic calculator. The X-Y plotter-input commands are PEN ↑, PEN ↓, and x and y coordinates to which the pen-carriage is to be moved. The x and y coordinates are specified by decimal numbers in the range 0000 to 9999. The corresponding actual pen range of physical movement is determined by adjustments on the plotter itself. The FMT, ↑ command-sequence causes the pen to be raised and the contents of the x- and y-registers to be fed to the plotter as the x and y coordinates to which the pen is to be moved. The FMT, ↓ command-sequence lowers the pen and transmits the x-y coordinates. Note that for both commands the pen is raised or lowered first and the pen carriage is then moved. The x-y coordinates in the x- and y-registers must be pre-scaled by the user in the range 0000 to 9999. If these limits are violated, the following events occur:

1. If the contents of the x- and/or y-registers are less than 0000 (i.e. negative), 0000 is sent to the plotter, the pen is raised, moved, and lowered.

2. If the contents of the x- and/or y-registers are greater than 9999, 9999 is sent to the plotter, the pen is raised, moved, and lowered.

The result is to plot a series of dots along the boundary of the plot. The raising and lowering of the pen is a visual and audible warning to the user that he is plotting out-of-bounds.

The basic calculator includes provision for recording a user-program in the program storage section of the RWM as a secure program. This provision is completely distinct from a protected recording obtained by physically notching the magnetic card. A secure program is, by definition a program which can be executed only. It cannot be listed, recorded, looked-at in the program mode, edited, or changed in any way. It is a program which can only be executed in the automatic operating mode at high speed by using the CONTINUE key (or step-by-step using the STEP PRGM key hereinafter explained).

Any program entered by the user from the keyboard input unit into the program storage section of the RWM, or any non-secure program loaded from a magnetic card, can be recorded as a secure program. This is accomplished in the same manner as described above in connection with the RECORD key except that the keys FMT and RECORD are sequentially depressed in the named order to initiate the recording operation. The program thereupon recorded on the magnetic card or cards is a secure program. The original program also remains in the program storage section of the RWM as a non-secure program, and can be recorded again, either as a secure or non-secure program. It should be noted that once recording of a secure program has begun, it must be completed by continuing to insert cards until recording is terminated by an END program step. If the recording process is interrupted by depression of the STOP key, the recording will be terminated but the original program stored in the program storage section of the RWM then becomes a secure program and can only be executed—no further recordings can be made.

If a program stored in the program storage section of the RWM is a secure program (either by loading a program recorded as a secure program or by the STOP default outlined above) the following conditions prevail:

1. If the PRGM key is depressed, the entire program memory is cleared.

2. If LIST or RECORD are depressed, they are ignored, so that no listing or recording of the program can be made. These actions do not destroy the program—they are just ignored.

3. Since the program is destroyed by switching to the PRGM mode, the program cannot be changed or edited in any way.

Loading of a secure program is no different than loading a non-secure program—the same procedure holds. Several secure programs may be chain-loaded. If a non-secure program is loaded into the calculator when a secure program is already stored therein, the program storage section of the RWM is cleared of the secure program in all areas not loaded by the non-secure program so that no trace of the secure program remains after loading the non-secure program. Thus, a non-secure program may not be chain-loaded after a secure program. However, the reverse can be done—a secure program can be chain-loaded to a non-secure program but the composite program is then secure.

The command sequence FMT, GO TO is used to implement automatic or program-controlled loading of magnetic program cards. The effect of FMT GO TO is the same as the following sequence: GO TO, 0, LOAD, GO TO, 0, and CONTINUE. This may be used to load a program from the keyboard, with automatic intiation of execution, or it may be used in a program to "link" programs. If the magnetic card reading and recording unit is not loaded with a magnetic card, the INSERT CARD indicator light will come on indicating to the user that a magnetic card should be inserted. The LOAD routine operates in the same manner as described above in connection with the LOAD key and is terminated by an END program step on the magnetic card.

The command sequence FMT, x→causes the contents of the available numeric-addressed data-registers in the data storage section of the RWM to be recorded on a magnetic card. The INSERT CARD indicator light comes on, and the recording continues, pass-after-pass, card-after-card until all registers are recorded, at which time the magnetic card reading and recording unit stops and the INSERT CARD indicator light goes out. If the FMT, x→command sequence was executed from a stored-program, the program will return to execution at the keycode immediately following the x→command. Recording may be terminated after any card by depressing the STOP key if the FMT x→command sequence came from a stored program, execution may then be resumed by depressing the CONTINUE key.

The command sequence FMT x←causes the loading of the available numeric-addressed data registers in the data storage section of the RWM from one or more magnetic data cards. These registers are loaded card-after-card until all the registers are loaded. The INSERT CARD light remains on, and the card unit continues to run until all are loaded. The loading may be terminated by a STOP key. If the FMT, x←command sequence is executed from a stored program, execution resumes after a completed data load.

The PRINT/SPACE key causes the contents of the x-register to be printed in the same format as it is displayed (i.e. FIX 0, n, or FLOAT). If additional PRINT/SPACE commands follow immediately, they will cause the printer to space (print a blank line). If the PRINT/SPACE command follows immediately after a numeric entry to x (from the keyboard or from a sequence of digit-keys in a program) the numeric printout is followed by an * (asterisk) indicating that this was a data entry and not a computed result.

The PAPER key is depressed to space the strip of thermal-sensitive paper used by the output printer unit. It continues to drive the paper upward until it is released.

Program Checking and Editing Keys (STEP/PRGM, BACK/STEP)

The STEP PRGM key is not programmable and is used, from the keyboard only, to single-step programs. When the calculator is in the manual operating mode the STEP PRGM key single-steps program execution. Each time STEP PRGM is depressed the program counter is incremented by one so that one program step is executed. When the calculator is in the program mode the STEP PRGM key enables the program steps stored in the program storage section of the RWM to be viewed. Each time the STEP PRGM key is depressed, the program counter is incremented by one, so that the address and program step displayed in the y-register shifts to the z-register, those in the x-register shift to the y-register and the next higher address and program step appears in the x-register.

The BACK STEP key is not programmable and is used to decrement the user program counter by one each time it is pressed. This backs up the output display (i.e. does just the opposite of the STEP PRGM key). It should only be used in the program mode. If the STEP PRGM and BACK STEP keys are depressed alternately, the same program step will be executed repeatedly. This key is extremely useful in editing and checking programs and when used with the PRGM STEP key permits the user to advance either forward or backward through a stored program one step at a time.

Definable and Redefinable Keys

The half keys A-O comprising the group of definable keys 91 enable the calculator to be tailored to the special needs of the user. Operation of these keys is defined by the various plug-in ROM modules 92 that may be used with the calculator. Without these ROM modules the definable keys 91 serve no function and accidently depressing them, or encountering them in the execution of a stored program, will result in a completely nondestructive no-operation.

The plug-in ROM modules 92 include the alpha ROM module mentioned above, a definable functions ROM module, a mathematics ROM module, a statistics ROM module, and a typewriter ROM module. Both the alpha ROM module and the typewriter ROM module redefine nearly all of the keys of the keyboard as well as defining the definable keys 91 themselves. The definable functions ROM module, the mathematics ROM module, and the statistics ROM module each uniquely define the definable keys alone and may each be used at the same time as the alpha ROM module or the typewriter ROM module.

A different overlay 192 is associated with each of the definable functions, mathematics, and statistics ROM modules and is employed with the definable keys 91 to identify the functions performed therby when its associated ROM module is plugged into the calculator. Each of these overlays 192 comprises a thin metal template that fits over the definable keys 91 and latches into a recess around them. The graphics on these templates visually complete the key shapes and indicate the key function. A small tab positioned just above the nameplate releases each template, which then pops up enough to grasp. Three holes 196 near the top edge of each template allow direct viewing of three light-emitting diode indicator lights used to indicate various operating conditions associated with the routines implemented by the ROM module. When the overlay and its associated ROM module are not in use they may be secured together by a pair of tabs 198 provided on the ROM module.

Alpha ROM Module

The Alpha ROM module redefines the keyboard input unit as indicated by the letters printed on the tops of the definable keys 91 and the letters and symbols printed on the front sides of most of the other keys to provide an "alpha keyboard" containing 54 character-entry keys, 5 operational keys, and 16 "non-essential" keys (these non-essential keys are either inoperative or duplicate other keys during the alpha mode). During the alpha mode, the key-log feature is deactivated (thus, any keys pressed are not logged).

The 54 character-entry keys include all of the English alphabetic characters A-Z, all of the decimal numbers 0-9, and all of the following symbols @, √, / (printed by the ÷ key), ×, −, +, π, →, ,, ., =, $, ?, (, ), %, ", and #. Depressing any of these keys during the alpha mode, will cause the alphameric character or symbol indicated thereby to be printed out in line-printer fashion. The output printer unit operates as a line printer in that each character is not immediately printed out, but rather an entire line (16 characters) is first stored and then printed out. The print-out occurs as the 16th character is entered.

The 5 operational keys include the FMT key, the STOP key, a SPACE key (normally the CONTINUE key), a CLEAR/RETURN key (normally the CLEAR key), and a PAPER key.

During the alpha mode, the following operational keys are depressed to perform various printing operations. Depressing the FMT key twice redefines the keyboard to the alpha mode, after which character keys may be depressed. After the last character is entered, depressing the FMT key causes a line print, a line feed, and returns the keyboard to normal operation. (The output display is blanked during the alpha mode, although the contents of the x-, y-, and z-registers remain unchanged.) For example, the alphabet may be printed by sequentially depressing the RUN, STOP, FMT, FMT, A through Z, and FMT keys.

Depressing the SPACE key insets a blank space in the printed line (similar in operation to the space bar on the typewriter).

Depressing the CLEAR/RETURN key causes a line print and advances the printer to the next line (i.e. like a typewriter carriage-return and line feed operation). The alpha mode remains set after this instruction. Successive CLEAR instructions will cause the printer to advance, without printing, one line for each instruction.

Depressing the STOP key terminates the alpha mode without a line print or line feed. Any characters entered but not printed will be erased when STOP is pressed. This instruction is not programmable and should not be used while programming alpha messages.

The PAPER key is a manual paper advance control. This operation is not programmable.

The 16 "non-essential" keys include the ↓, x⤬y, ↑, $\frac{PRINT}{SPACE}$, $\frac{SUB}{RETURN}$, END, $\frac{BACK\ STEP}{STEP,\ PRGM,}$ FLOAT, FIX ( ), RUN, PRGM, KEY LOG, LIST, LOAD, and RECORD keys. These keys are not essential for alpha printing operations. The non-essential keys which are programmable duplicate the SPACE key, while most of the non-programmable keys are "locked-out" (i.e. not operational) during alpha printing operations. Pressing BACK STEP or STEP PRGM will cause 1 or 0, respectively, to be printed.

We claim:

1. An electronic calculator comprising:

keyboard input means including a plurality of keys for entering information into the calculator;

first memory means, including a plurality of storage registers into which information may be written and from which information may be read;

second memory means for storing routines to be executed by the calculator in performing selected functions;

processing means, coupled to said keyboard input means and first and second memory means, for executing selected ones of the routines stored in the second memory means to perform certain functions employing information from one or both of the keyboard input means and first memory means; and output display means, coupled to said processing means, for providing a visual output indication of the results of functions performed by the calculator;

said keyboard input means including first control means for specifying a first angular measurement conversion function and further including second control means for specifying a second angular measurement conversion function;

said output display means being operative for displaying the contents of a plurality of the storage registers of said first memory means;

said processing means including logic means responsive to actuation of said first control means, following entry from the keyboard input means of three data items representing an angular measurement expressed, respectively, in degrees, minutes, and seconds, for converting that angular measurement so expressed to the equivalent angular measurement expressed in decimal degrees, for storing the resultant angular measurement expressed in decimal degrees in a specified one of the storage registers of said first memory means, and for causing that resultant angular measurement to be visually displayed on said output display means;

said logic means being further responsive to actuation of said second control means, following entry from the keyboard input means of a data item representing an angular measurement expressed in decimal degrees, for converting that angular measurement so expressed to the equivalent angular measurement expressed in degrees, minutes, and seconds, for storing the resultant angular measurement expressed in degrees, minutes, and seconds in a specified three of the storage registers, respectively, of said first memory means, and for causing that resultant angular measurement to be visually displayed on said output display means.

* * * * *

UNITED STATES PATENT AND TRADEMARK OFFICE
CERTIFICATE OF CORRECTION

PATENT NO. : 4,455,607

DATED : June 19, 1984

INVENTOR(S) : Robert E. Watson et al.

It is certified that error appears in the above-identified patent and that said Letters Patent is hereby corrected as shown below:

Column 1, line 11, "1979" should be --1979,--;

Column 3, line 47, "steppiing" should be --stepping--;

Column 6, line 6, "clock." should be --clock,--;

Column 8, line 57, "storing the" should be --storing and--;

Column 14, line 23, "keylog" should be --key-log--;

Column 18, line 18, "this" should be --the--;

Column 19, line 35, "Automatic Operation" should be --Automatic Operating--;

Column 19, line 40, "program subprogram" should be --program or subprogram--;

Column 19, line 44, "RWM;" should be --RWM:--;

Column 23, line 42, "depresed" should be --depressed--;

Column 23, line 68, "3,14159265360)" should be --3.14159265360)--;

Column 24, line 5, "y," should be --y-,--;

Column 25, last line of the table currently reading "÷ 10 1.1 11" should read --÷ 10 <u>1.1</u> 11--;

Column 26, line 59, "x→()" should be --x←()--;

Column 26, line 66, "x→()," should be --x←(),--;

Column 29, line 64, "y ()" should be --y()--;(Letters Patent only)

UNITED STATES PATENT AND TRADEMARK OFFICE
CERTIFICATE OF CORRECTION

PATENT NO. : 4,455,607

DATED : June 19, 1984

INVENTOR(S) : Robert E. Watson et al.

It is certified that error appears in the above-identified patent and that said Letters Patent is hereby corrected as shown below:

Column 33, line 9, "next an" should be --next at--;

Column 33, line 47, ""programs" should be --"program--;

Column 36, line 44, "themselves," should be --themselves--;

<u>In the Drawings</u>

Figure 2 should be deleted, but will apply to the Letters Patent only

Signed and Sealed this

Thirtieth Day of October 1984

[SEAL]

Attest:

Attesting Officer

GERALD J. MOSSINGHOFF

Commissioner of Patents and Trademarks